United States Patent [19]
Harben

[11] Patent Number: 5,679,922
[45] Date of Patent: Oct. 21, 1997

[54] SQUIRREL SHIELD DEVICE

[75] Inventor: Michael Harben, Woodstock, Ga.

[73] Assignee: Georgia Power Company, Atlanta, Ga.

[21] Appl. No.: 433,151

[22] Filed: May 3, 1995

Related U.S. Application Data

[63] Continuation-in-part of Ser. No. 138,035, Oct. 15, 1993, abandoned.

[51] Int. Cl.$^6$ .................................................... H01B 17/00
[52] U.S. Cl. .................. 174/5 R; 174/138 R; 174/139; 52/101
[58] Field of Search ............... 174/138 R, 139, 174/140 R, 5 R, 144, 140 CR, 209; 119/174, 57.9; 114/221 R; 52/101

[56] References Cited

U.S. PATENT DOCUMENTS

| | | | |
|---|---|---|---|
| 1,766,636 | 6/1930 | Holzel | 174/139 |
| 2,617,378 | 11/1952 | Osol | 114/221 |
| 2,999,479 | 9/1961 | Carder | 19/1 |
| 3,005,436 | 10/1961 | Caldwell | 114/221 |
| 3,016,034 | 1/1962 | Raistakka | 114/221 |
| 3,056,376 | 10/1962 | Bender | 116/23 |
| 4,053,707 | 10/1977 | Ely et al. | 174/209 |
| 4,201,883 | 5/1980 | Shepherd | 174/139 |
| 4,467,387 | 8/1984 | Bergh et al. | 361/132 |
| 4,731,507 | 3/1988 | Torimoto et al. | 174/139 |
| 5,023,406 | 6/1991 | Thornley | 174/209 |
| 5,293,721 | 3/1994 | Richard et al. | 52/101 |
| 5,293,835 | 3/1994 | Shagoury | 119/57.9 |

OTHER PUBLICATIONS

"In Praise of Squirrels," by Diane Ackerman, *National Geographic*, Nov. 1995, pp. 98–113.
Fargo Product Literature, Oct., 1990, pp. 11–12.
Guthrie Guard Product Literature, 1989, pp. 1–6.
Raychem Product Literature Catalog, Jul., 1993, pp. 1–20.
Salisbury Wildlife Protection Product Literature, Apr., 1990.

*Primary Examiner*—Hyung S. Sough
*Assistant Examiner*—Paramita Ghosh
*Attorney, Agent, or Firm*—Troutman Sanders LLP

[57] ABSTRACT

The invention relates to a shield which prevents squirrels or other animals from causing faults in power distribution substations. Switch and bus insulators are primary points of contact when a small animal crawls from a grounded, supporting structure across an insulator to an energized conductor. The present invention provides for a barrier on switch and bus insulators which prevents animals from coming into contact with a grounded structure and an energized conductor simultaneously, thus eliminating a ground path from the energized conductor through the animal to the grounded structure.

42 Claims, 19 Drawing Sheets

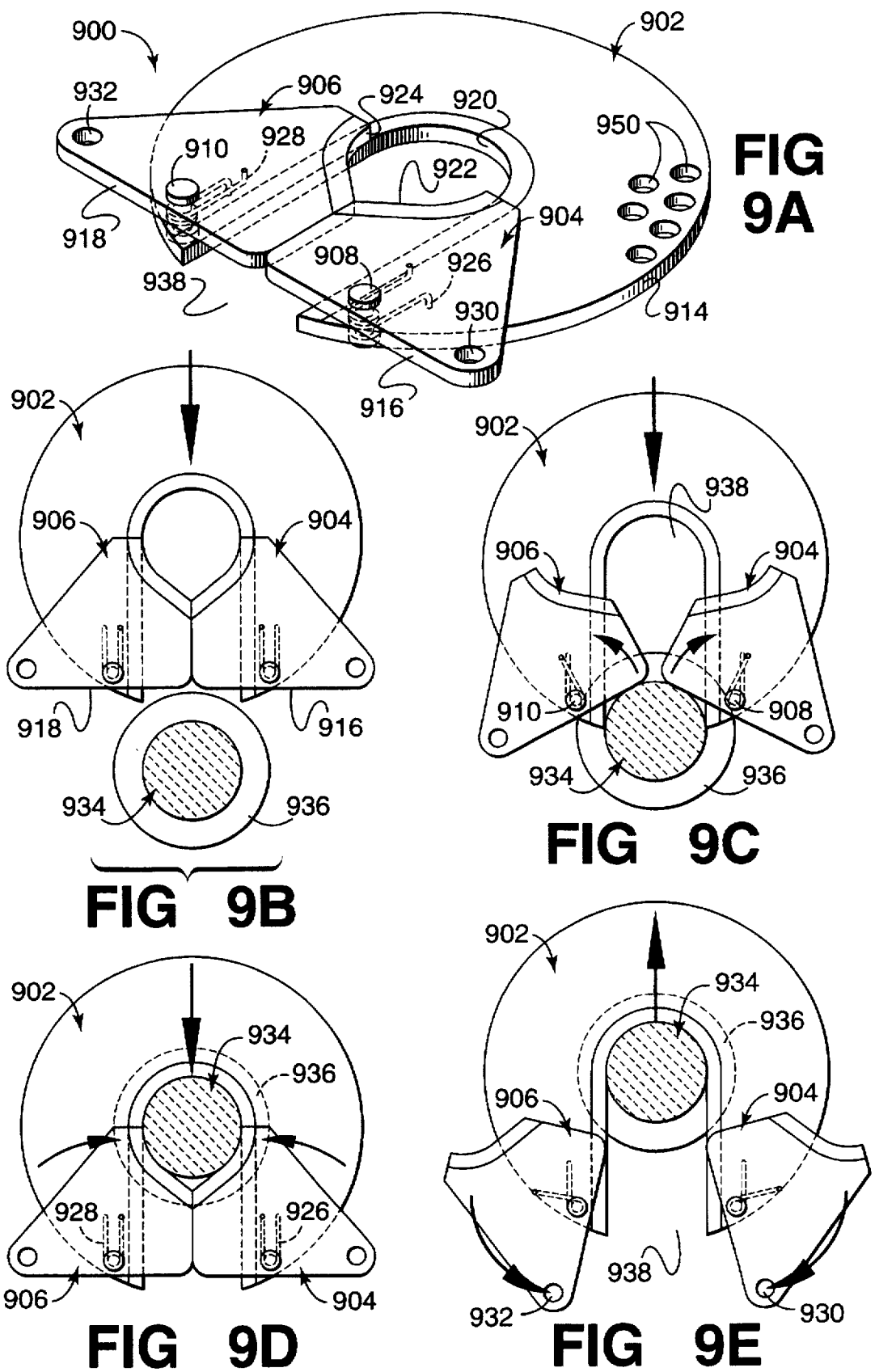

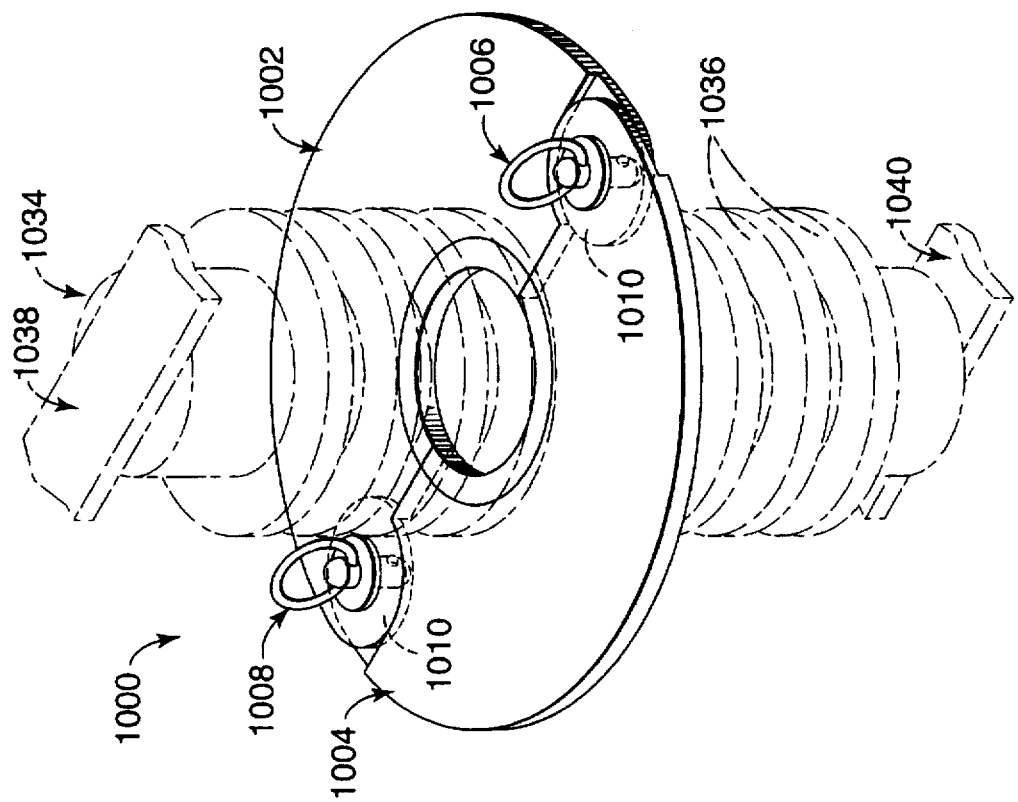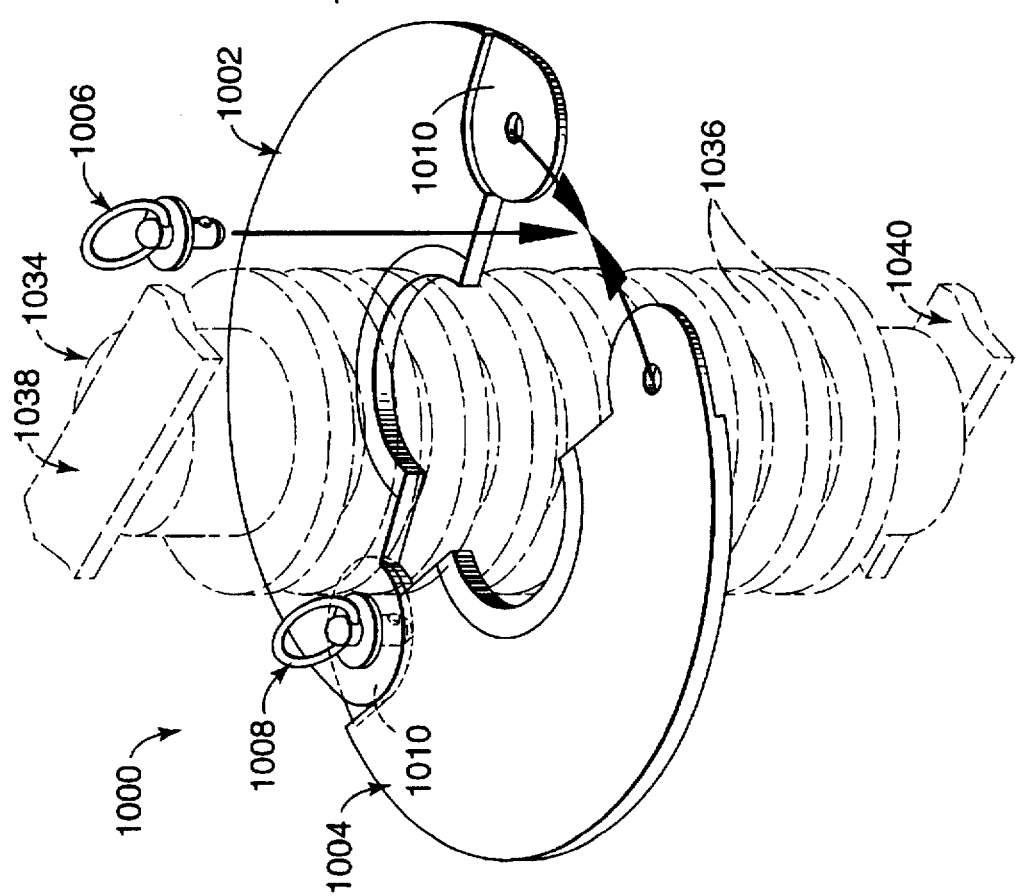

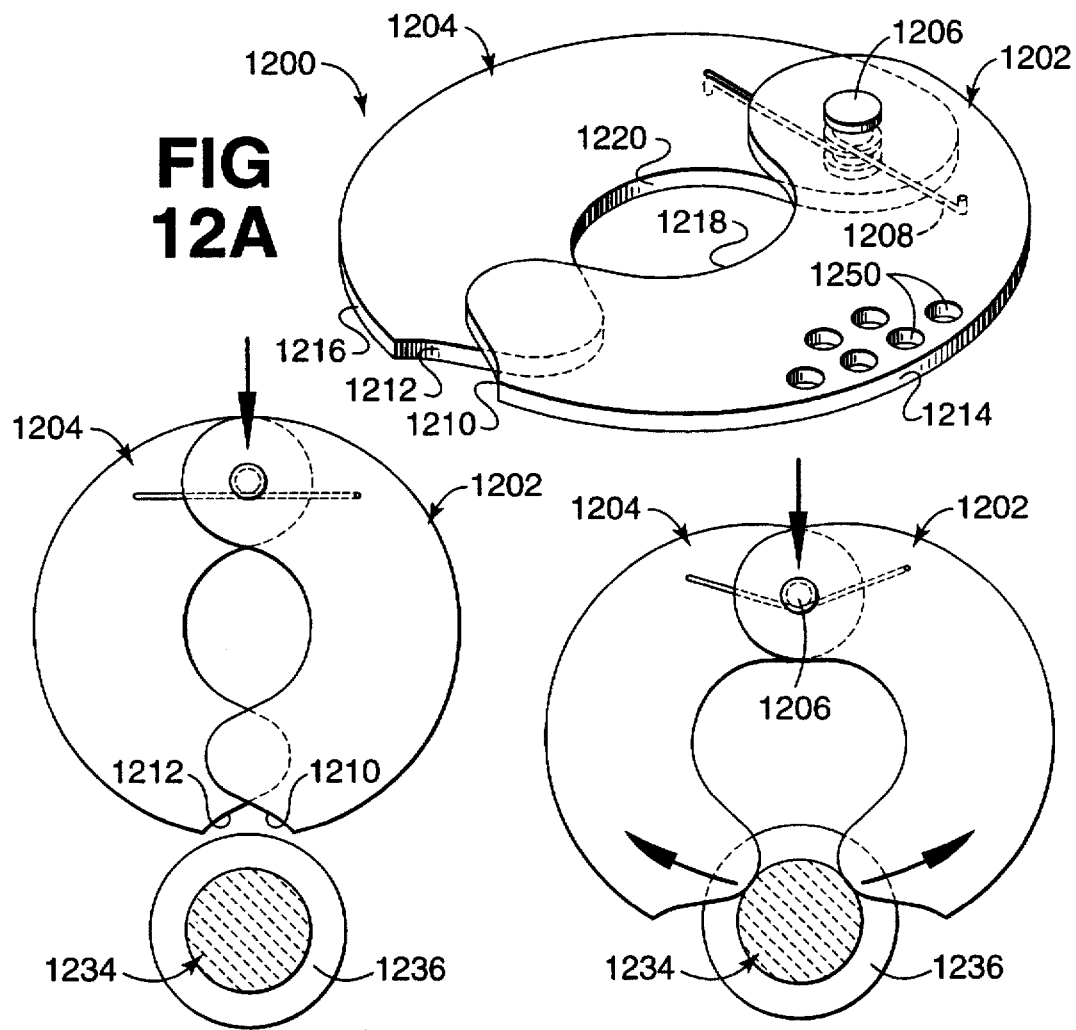
FIG 12A
FIG 12B
FIG 12C
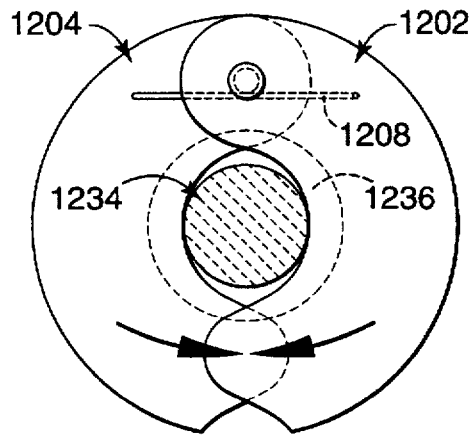
FIG 12D
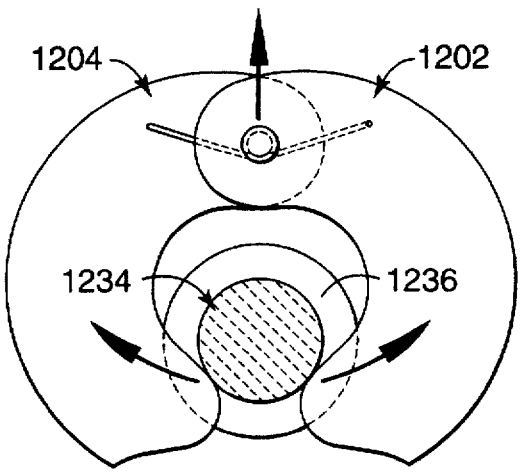
FIG 12E

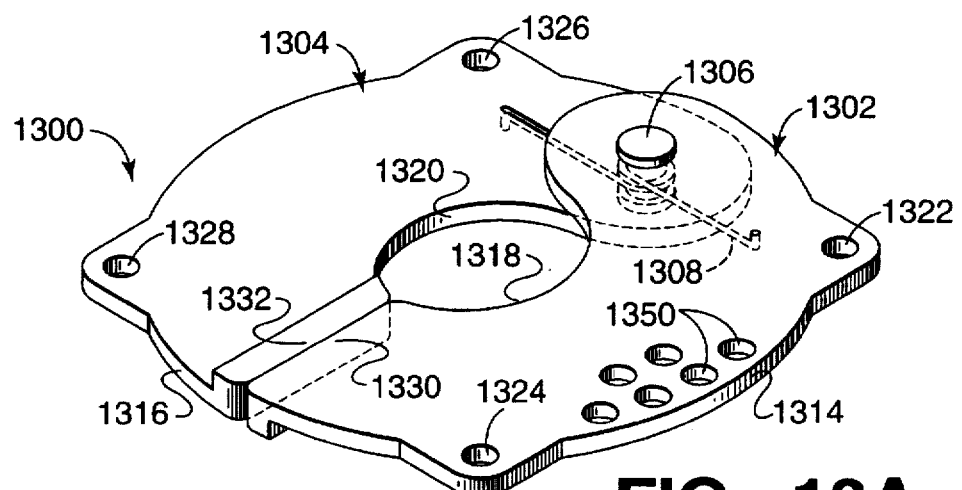
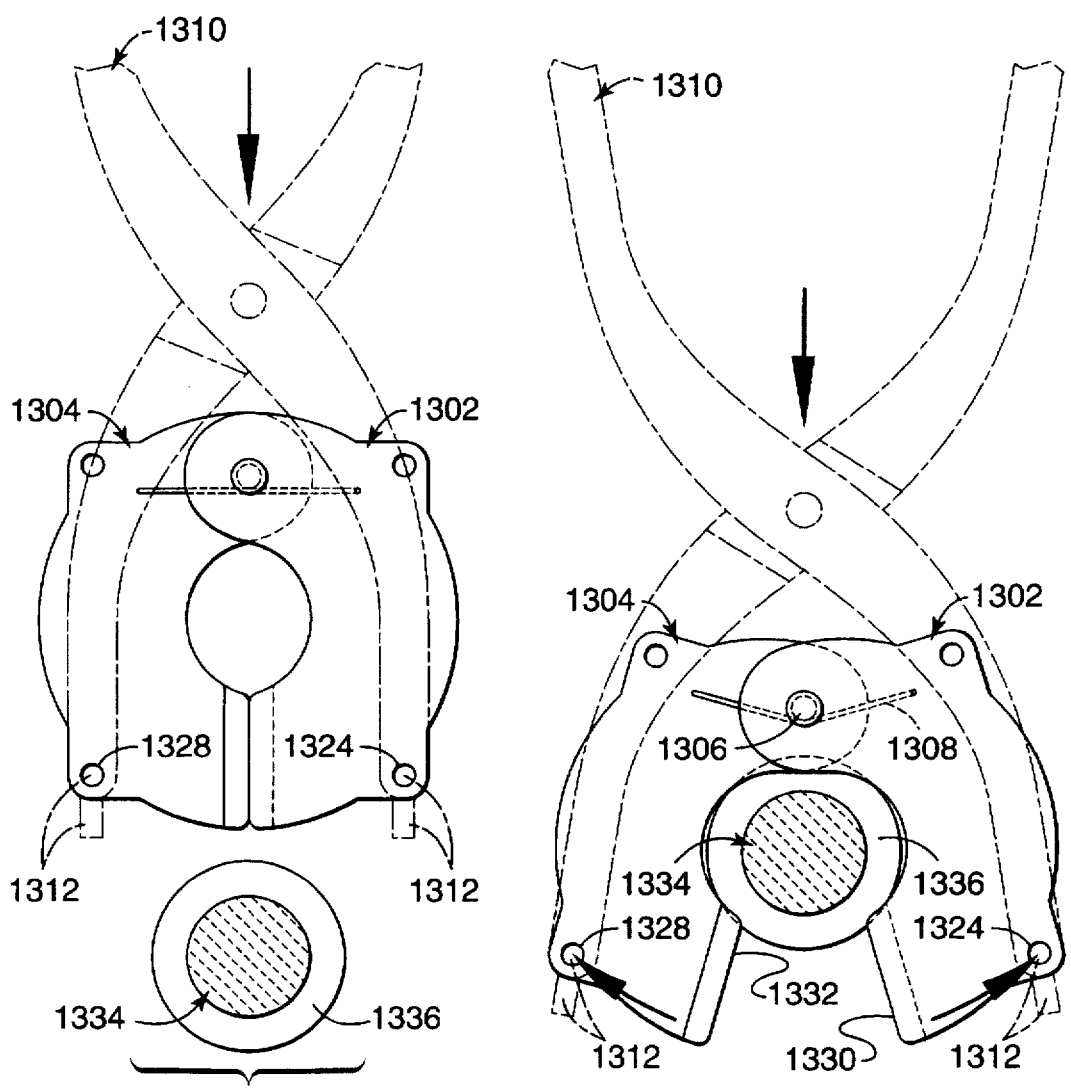
FIG 13A
FIG 13B
FIG 13C

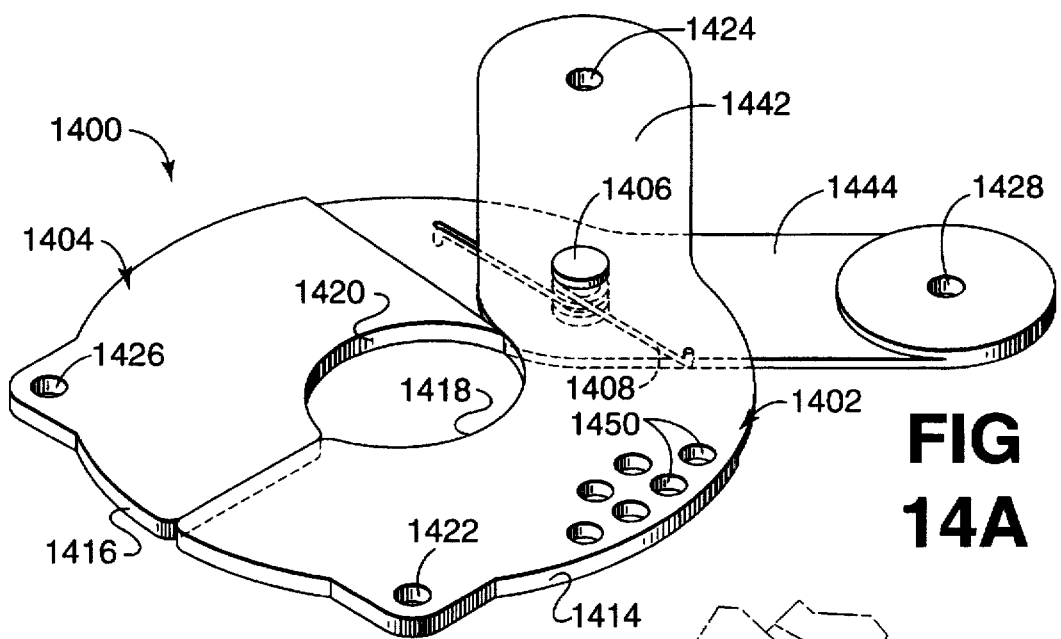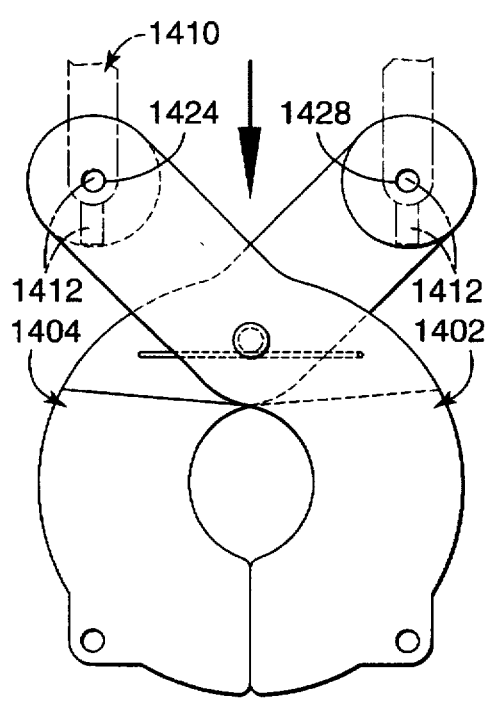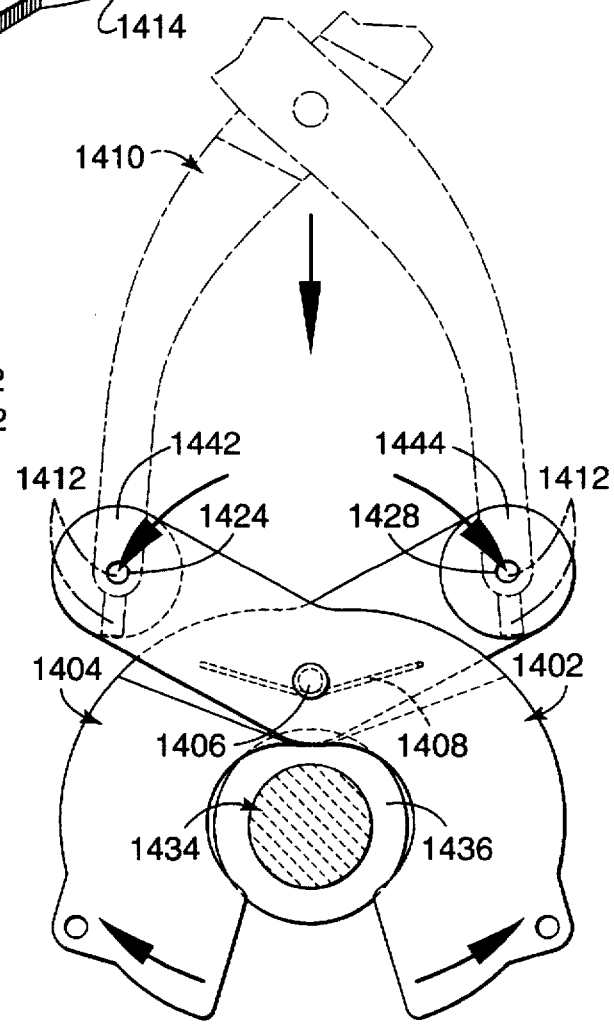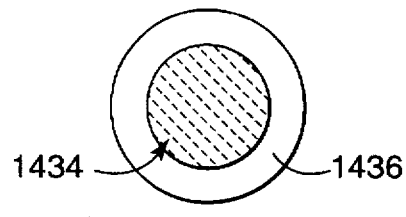
FIG 14A
FIG 14B
FIG 14C

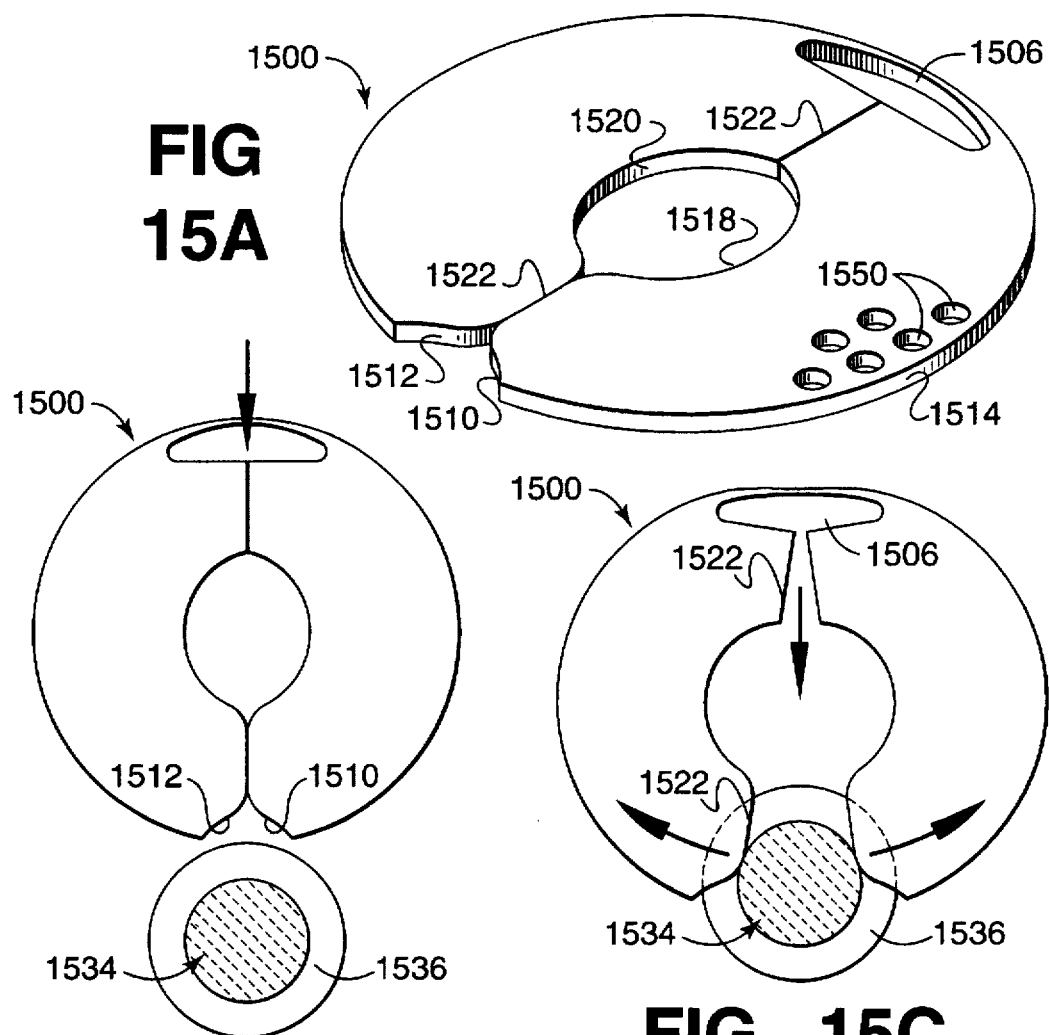
FIG 15A
FIG 15B
FIG 15C
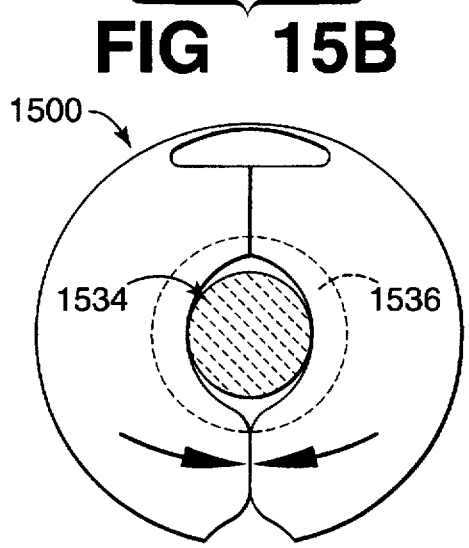
FIG 15D
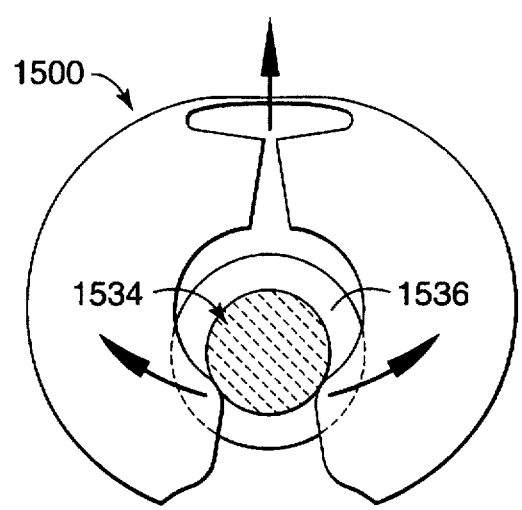
FIG 15E

SQUIRREL SHIELD DEVICE

CONTINUING APPLICATIONS

This application is a continuation-in-part of parent application Ser. No. 08/138,035 filed on Oct. 15, 1993, now abandoned.

BACKGROUND OF THE INVENTION

1. Technical Field

This invention relates generally to devices which protect various electrical components from contact with small animals and, more particularly, to a device which prevents a small animal from simultaneously contacting an energized component and a grounded conductive structure within an electrical power distribution substation.

2. Description of the Prior Art

Squirrels or other small animals climbing onto electrical equipment in power distribution substations often ground energized equipment and cause "low-side faults." A low-side fault generally refers to a short circuit to ground on a low voltage bus and/or other electrical equipment connected to a low voltage side of a step-down transformer in a power distribution substation. Low voltage in this context refers to power distribution voltage levels which may be tens of thousands of volts. When a small animal provides a conducting path from an energized substation component to ground via a support structure, extensive damage both to the animal and to electrical equipment may occur. Such an occurrence causes a low-side fault within the substation leading to damage to transformers, insulators, switches, feeder breakers, and other equipment due to high values of electrical fault current, and electrical arcs generated by the short circuit. An explosion or fire may result, along with interruption of electrical power service to power consumers. Repairing the damage from a low-side fault is costly and also requires an extended interruption of service to customers. Thus, small animals such as squirrels that crawl on exposed, energized components can cause extensive damage to unprotected components within the substation and are a nuisance to electric power producers whose ultimate goal is to provide customers with electricity free from interruption.

A number of devices have been used in attempts to prevent small animals from coming into contact with energized substation components and grounded structures. Fake owls have been placed on substation structures with the intention of warding off squirrels or other small animals. Ultrasonic devices and lights have been used as a deterrents to small animals. Finally, trapping devices, animal repellents, and screening have also been used to prevent small animals from approaching power substations. Unfortunately, none of the above-mentioned deterrents have proved to have a significant effect on the number of animal-caused faults in power distribution substations.

Other devices have been placed directly in contact with energized contacts or support structures. Grease lubricants have been applied to support structures to prevent animals from climbing on power substations; however, normal weather conditions have been known to degrade and reduce the lubricating effect of grease. Furthermore, greased structures within a power substation have not presented a favorable work environment for maintenance crews. Heat-shrinkable tape and insulating paint have been used on supporting structures and energized buses to prevent small animals from grounding an energized surface or contact. Unfortunately, heat-shrinkable tape and paint have also been found to degrade from exposure to the weather, and thus have only limited effectiveness. Furthermore, insulating material degrades when in direct contact with an energized surface. This degradation has been termed "insulation breakdown," and has limited the effectiveness of insulating paint, heat-shrink tape, and other cover-up devices in adequately covering energized surfaces. Moreover, small animals climbing on substation equipment often puncture heat-shrinkable tape and insulating paint with their claws or nails. Cover-up devices have been used for breaker bushings, lightening arrestor leads, and station service transformer leads; however, spaces between switch and bus insulators or bus insulators and steel structures remain unprotected. Unfortunately, unprotected portions of energized structures near bus insulators in substations have been the primary points of contact for squirrels and other small animals.

SUMMARY OF THE INVENTION

While fake owls, screens, and animal repellents have been used in an attempt to keep animals out of power distribution substations; and while tapes, paints, and various covering devices have been used to protect breaker bushings and lightening arrestor leads from contact with small animals, no such guard or shield has been developed which would effectively protect switch insulators, bus insulators, and various bushings by preventing an animal from simultaneously making contact with a grounded structure and a high voltage conductor.

The invention generally relates to a shield which prevents squirrels or other animals from causing faults on energized equipment in power distribution substations. Switch and bus insulators are primary points of contact when a small animal crawls from a supporting, grounded structure across the insulator to an energized conductor. Other points of contact include breaker and transformer bushings. The present invention therefore provides for a shield on intermediary devices to prevent animal-caused faults. Generally, an intermediary device is constructed of non-conducting material, mounted on a grounded structure, such as a support structure or some type of grounded housing, and supports a conductive device. Examples of intermediary devices are switch insulators, bus insulators, breaker bushings, transformer lead bushings, and any other type of insulator or bushing. The shield is mounted on an intermediary device and prevents animals from simultaneously contacting a grounded structure and an energized conductor, thus eliminating a ground path from the energized conductor through the animal to the grounded structure. This prevents damage resulting from high fault current flowing though the contact to ground at the point where the small animal immediately contacts the energized equipment.

In several embodiments, a squirrel shield according to the present invention may be constructed from any durable nonconducting material. For example, a transparent material such as UV treated Lexan (a registered trademark of General Electric) polycarbonate sheet plastic can be used as a material for fabricating the squirrel shield. Generally, any nonconducting material which is resistant to UV radiation is appropriate constructing a shield according to the present invention. Additionally, an opaque material may be adequate for shield material; however, sight apertures are generally desirable when using an opaque material so that a technician may view other equipment behind or near the squirrel shield after installation.

In a first embodiment, the shield is formed from two semi-circular or rectangular portions. At least one shield portion has a slot defined by space between two extensions and a central edge. The central edge is adapted to conform to the intermediary device when the shield is assembled. More specifically, the slot is adapted to fit around a diameter of the intermediary device between skirts and over corresponding portions of another shield portion, such that corresponding portions of each shield portion overlap one another. Appropriate fastening means such as bolts, pop rivets, plastic adhesive, hinges, bolts, springs, longitudinal interlocking protrusions and matching depressions, or any other appropriate means hold the overlapping portions together around the intermediary device. The shield extends radially outward and substantially perpendicular to a longitudinal axis of the insulator or bushing. Since these embodiments retrofit a shield to one or several intermediary devices, the shield can be installed when substation equipment is energized. This is not possible with many conductor covering techniques. Additionally, the shield may employ extensions between shield elements for allowing the shield to be mounted around several intermediary devices simultaneously.

In another embodiment, the shield is formed integrally with an intermediary device so as to provide for an intermediary device-shield combination apparatus that is formed of only one piece. This apparatus allows maintenance crews to install only one piece which not only provides support to a conductor or an energized device, but also provides for protection against animal-caused faults.

Small animals crawling from a grounded structure across an insulator or bushing must climb around the shield to arrive at an energized device or conductor. The shield is of sufficient radius or width (measured perpendicular to a longitudinal axis of the insulator or bushing) such that the animal cannot simultaneously contact the grounded structure and energized conductor or device. The animal must climb from the grounded structure over the shield, then from the shield to the energized conductor or vice versa, thereby eliminating the animal as a path to ground.

In another embodiment, a shield according to the present invention includes two shield portions. At least one shield portion includes a main portion substantially rectangular in shape with a slot defined by space between two extensions extending from the main portion. The shield portions having slits are adapted to fit around an insulator, and the assembled shield is substantially rectangular in shape.

In still another embodiment, a shield according to the present invention includes several square shields adapted to fit over insulators which are located close to one another. In this embodiment, peripheral edges of each individual shield overlap with adjacent shields, forming a larger shield over several insulators.

In yet another embodiment, a shield of two portions according to the present invention is adapted to fit over a group of insulators. In this embodiment, at least one portion of the shield includes a main portion substantially rectangular in shape with at least three extensions extending from the main portion. Slots are located between extensions and always number one less than the number of extensions. The shield portions having slits are adapted to fit around the insulators. The assembled shield is substantially rectangular in shape.

In still another embodiment, an apparatus according to the present invention comprises a shield which is integral with an electrical insulator, forming a shielded insulator of unitary construction.

In still another embodiment, an apparatus according to the present invention comprises a shield which is integral with a bushing. Such a bushing is used in a power distribution substation to insulate an energized conductor from a grounded housing of a transformer or breaker. The shield prevents a small animal from simultaneously contacting a grounded housing of a breaker or transformer and an energized conductor. Alternatively, a shield of several portions may also be placed over an existing bushing between skirts. At least one shield portion includes a main portion with a slit defined by space between two extensions extending from the main portion. The shield portions having slits are adapted to fit around a bushing, and the assembled shield may be square, rectangular, or circular in shape.

In still another embodiment of the present invention, the shield may include a first substantially U-shaped plate-like shield element, including first and second front edge portions, and an inside edge portion adapted to fit around a medial portion of an insulator or other intermediary device. Additionally, the shield includes a second plate-like shield element adapted to fit partially around the intermediate device an inside edge portion, and a first hinge for rotatingly connecting the first and second shield elements around the intermediary device to form a shield assembly.

The shield assembly according to the present invention may also include a spring for rotatingly biasing the shield elements into engagement around the intermediary device. Specifically, the spring may include a first end connected to the first shield element and a second end connected the second shield element, wherein the spring biases the first shield element toward the second shield element to fasten the assembly around the intermediary device. The spring may be located on the shield assembly between the hinge and the intermediary device.

In yet another embodiment of the present invention, the shield assembly maybe comprised of a first shield element having a slot adapted to fit around an intermediary device. A second shield element may then slidingly engage the slot within the first shield element form a complete shield assembly.

In yet another embodiment of the present invention, the Oshield assembly may include three elements. The first shield element may include a first plate-like element having a slot adapted to fit around and intermediary device. The second and third elements are rotatably mounted to the first element and are adapted to engage the intermediary device and allow the shield to be mounted on the intermediary device, while locking the assembly into position on the intermediary device after mounting.

Additionally, each embodiment of the present invention may include mounting apertures for accepting a mounting tool for remote installation of the shield onto an intermediary device.

The present invention is inexpensive, easy to install, allows maintenance crews to visually inspect various components of the substation if transparent, and is not prone to insulation break-down since the shield is attached to an insulator or bushing rather than an energized surface. Moderate shield thickness provides for physical strength, a rugged barrier to small animals, and high voltage insulating properties between the conductor and the supporting grounded structure.

Accordingly, it is an object of the present invention to provide a shield which prevents animal-caused faults in the vicinity of any insulator in a power distribution substation.

It is another object of the present invention to provide a shield for use in power distribution substations which prevents animal-caused faults in the vicinity of insulating bushings.

It is another object of the present invention to provide a shield on an insulator or bushing for use in power distribution substations which is transparent and allows maintenance crews to visually inspect nearby components when installed.

Still another object of the present invention is to provide a shield which prevents animal-caused faults in power distribution substations which requires no specialized tools for installation.

Still another object of the present invention is to provide a shield which prevents animal-caused faults in power distribution substations that is not prone to insulation break down.

Still another object of the present invention is to provide a shield which is easily placed between a grounded structure and energized conductor without having to de-energize the conductor or disassemble the power distribution substation.

Finally, another object of the invention is to provide for a shield in power distribution substations which is durable and thus performs as an insulating barrier without being affected by temperature, moisture, debris, or excessive sunlight.

These and other objects are accomplished by the present invention which is more particularly set forth in the remainder of the specification.

BRIEF DESCRIPTION OF THE DRAWINGS

The accompanying drawings illustrate the preferred embodiment of the invention, and serve to aid in the explanation of the principles of the invention.

FIG. 9A illustrates a perspective view of a still another embodiment of a shield according to the present invention.

FIGS. 9B–9E illustrate a plan view of the embodiment of the shield illustrated in FIG. 9A during its mounting procedure onto a non-conducting intermediary device between a grounded structure and an energized conductor.

FIGS. 10A–10C illustrate a perspective view of still another embodiment of a shield according to the present invention.

FIG. 12A illustrates a perspective view of yet another embodiment of a shield according to the present invention.

FIGS. 12B–12E illustrate a plan view of the embodiment of the shield illustrated in FIG. 12A during its mounting procedure onto a non-conducting intermediary device between a grounded structure and an energized conductor.

FIG. 13A illustrates a perspective view of still another embodiment of a shield according to the present invention.

FIGS. 13B–13D illustrate a plan view of the embodiment of the shield illustrated in FIG. 13A during its mounting procedure onto a non-conducting intermediary device between a grounded structure and an energized conductor.

FIG. 14A illustrates a perspective view of a still another embodiment of a shield according to the present invention.

FIGS. 14B–14D illustrate the embodiment of FIG. 14A during its mounting procedure onto a non-conducting intermediary device between a grounded structure and an energized conductor.

FIG. 15A illustrates a perspective view of another embodiment of the present invention comprising a shield formed from a unitary piece of material.

FIGS. 15B–15E illustrate a plan view of the embodiment of the shield illustrated in FIG. 15A during its mounting procedure onto a non-conducting intermediary device between a grounded structure and an energized conductor.

Other objects, features and aspects of the present invention are discussed in greater detail below.

DETAILED DESCRIPTION OF THE INVENTION

Figure 1:
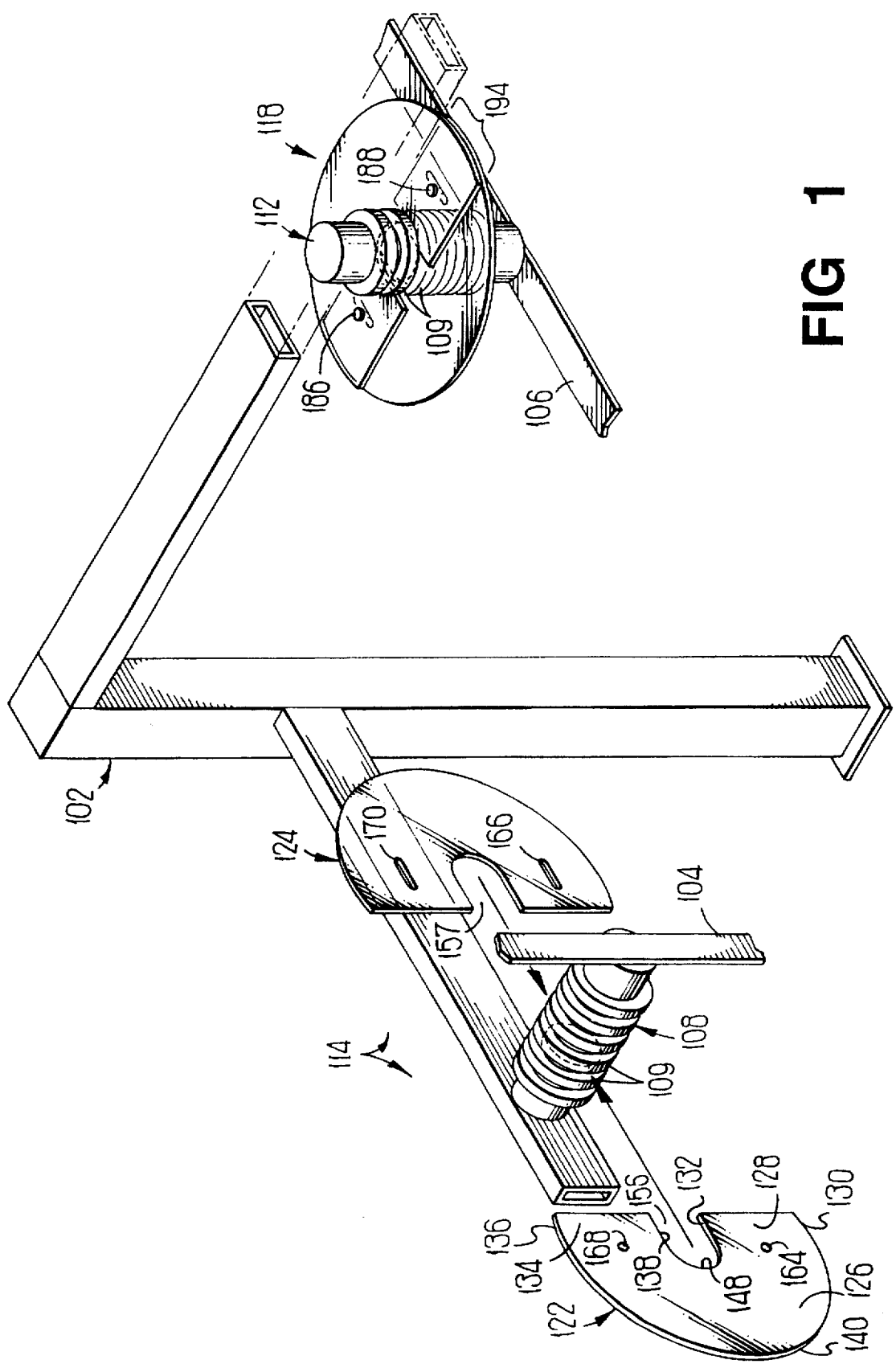
FIG. 1 is a perspective, exploded view of a first embodiment of a shield according to the present invention.

FIG. 1 illustrates a first embodiment of the present invention situated within a portion of a power distribution substation. Grounded supporting structure 102, shown generically, provides support for various conducting devices through insulating components within the power distribution substation. As shown in FIG. 1, ceramic insulators 108 and 112 extend from structure 102 horizontally and vertically, respectively. Insulators 108 and 112 support conducting devices 104 and 106. Conducting devices 104 and 106 may comprise a myriad of components including breakers, buses, switches, bare conducting cable, or any other electrically conducting device. Conducting devices 104 and 106 are normally energized at high voltage levels, making the conductors dangerous to small animals climbing in a power distribution substation.

Shield 114 is exploded in view in order to show relevant details. In this particular embodiment, the shield 114 is comprised of shield elements 122 and 124. Each element of shield 114 has several additional portions. A main portion 126 of shield element 122 is substantially semicircular in shape. Extensions 128 and 134 extend from main portion 126. Extension 128 is bordered longitudinally by outer edge 130 and inner edge 132. Similarly, extension 134 is bordered longitudinally by outer edge 136 and inner edge 138. Outer edges 130 and 136 are continuous with peripheral edge 140. Peripheral edge 140 is semicircular and is concentric with central edge 148. Inner edges 132 and 138 and central edge 148 form a slot 156.

Shield elements 122 and 124 are essentially identical except for the location of fastening means. Holes 168 and 164 on shield element 122 line up with elongated slots 170 and 166 on shield element 124. This fastening arrangement allows for longitudinal adjustment of the shield elements when placed onto an insulator. Shield 118, identical to shield 114 and shown assembled on insulator 112, illustrates fasteners 186 and 188 placed through the elongated holes and slots at overlapping portion 194. Fasteners 186 and 188 may be of any suitable type including bolts and nuts, screws, and pop rivets.

Slots 156 and 157 of shield elements 122 and 124, respectively, are adapted to be mounted over insulator 108 between skirts 109 as shown more clearly by assembled shield 118. The width of slots 156 and 157 is greater than a diameter of the insulator 108 between skirts 109 but less than an outer diameter of skirts 109. This allows for the shield to be supported between skirts such that extensions from element 122 match with and overlap extensions from element 124 between skirts 109. The shield is adapted to be placed between any two skirts on an insulator, but is usually placed between first and second or second and third skirts from the supporting structure while power is on. The shield is mounted on the insulator close to the supporting structure since protection devices, used on conductors 104 and 106 while power is on, allow little or no room for the shield to be placed in the middle portion of the insulator. However, when power is turned off, the shield may be placed between any two skirts.

Figure 2:
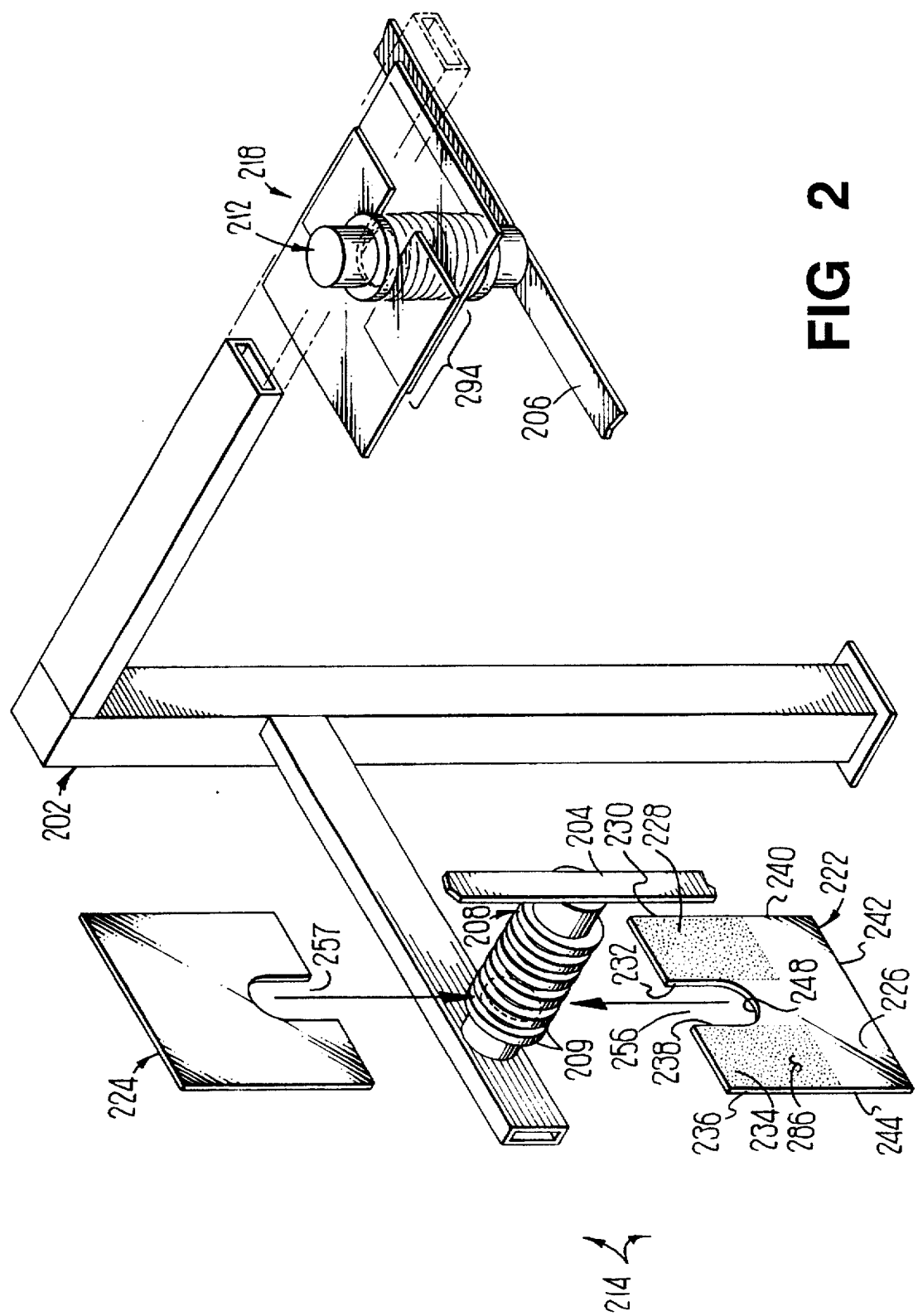
FIG. 2 is a perspective, exploded view of a second embodiment of a shield according to the present invention.

FIG. 2 illustrates a second embodiment of the present invention. Shields 214 and 218 are rectangular in shape after assembly. Shield elements 222 and 224 are similar in shape. Shield element 222 is comprised of main portion 226 which is rectangular in shape and bordered by peripheral edges 240, 242, and 244. Extensions 228 and 234 extend from main portion 226. Extension 228 is bordered longitudinally by outer and inner edges 230 and 232, respectively. Similarly, extension 234 is bordered by outer and inner edges 236 and 238, respectively. Inner edges 232 and 238 and central edge 248 define slot 256 which is adapted to fit over insulator 208 between skirts 209 in a manner identical to the first embodiment illustrated in FIG. 1. FIG. 2 also illustrates adhesive 286 as fastening means between shield elements 222 and 224. Any appropriate fastening means including screws, bolts and nuts, or pop rivets placed through drilled holes in overlapping area 294 can fasten the shield elements together. Shield 218, shown fully assembled, provides a barrier between grounded structure 202 and conductor 206. Shield 218 includes overlapping portion 294 which fits between skirts of insulator 212 in a manner similar to the first embodiment.

Figure 3:
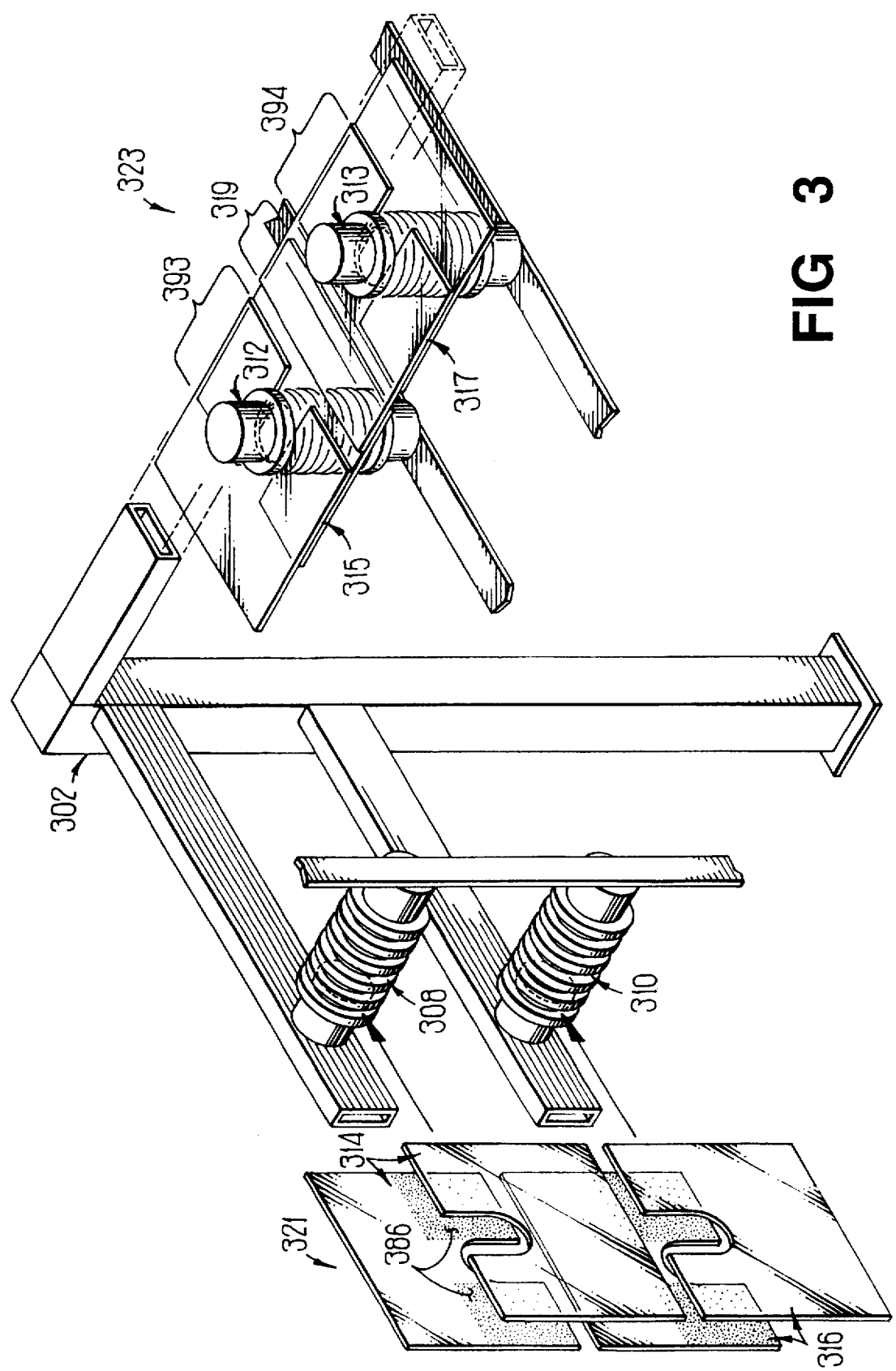
FIG. 3 is a perspective, exploded view of a third embodiment of a shield according to the present invention.

FIG. 3 represents a third embodiment of the present invention. In this particular embodiment, two or more insulators may be located close to each other on grounded structure 302. Shields 314 and 316 are mounted vertically between skirts of insulators 308 and 310, respectively, to form larger shield 321. In this embodiment, the shield pairs are fastened together using adhesive 386, although any fastening means may be used. A distance between insulators 308 and 310 is less than one half the width of shields 314 and 316. Similar shields 315 and 317 are mounted horizontally on insulators 312 and 313, fastened at overlapping portions 393 and 394, respectively, and form a larger shield 323. A distance between insulators 312 and 313 is less than one half the width of shields 315 and 317. Due to the close proximity of insulators in each pair, shield elements from separate shield assemblies form an overlap portion 319. According to this embodiment, a continuous shield may be created between any number of closely spaced insulators. Furthermore, overlapping portions may be created on any peripheral edge of a particular shield; such an arrangement creates a continuous barrier across a group of insulators which are not necessarily collinear. Furthermore, peripheral edges from separate shields which form overlapping portions 319 may also be fastened together, if needed, by any appropriate fastening means such as adhesive 386.

Figure 4:
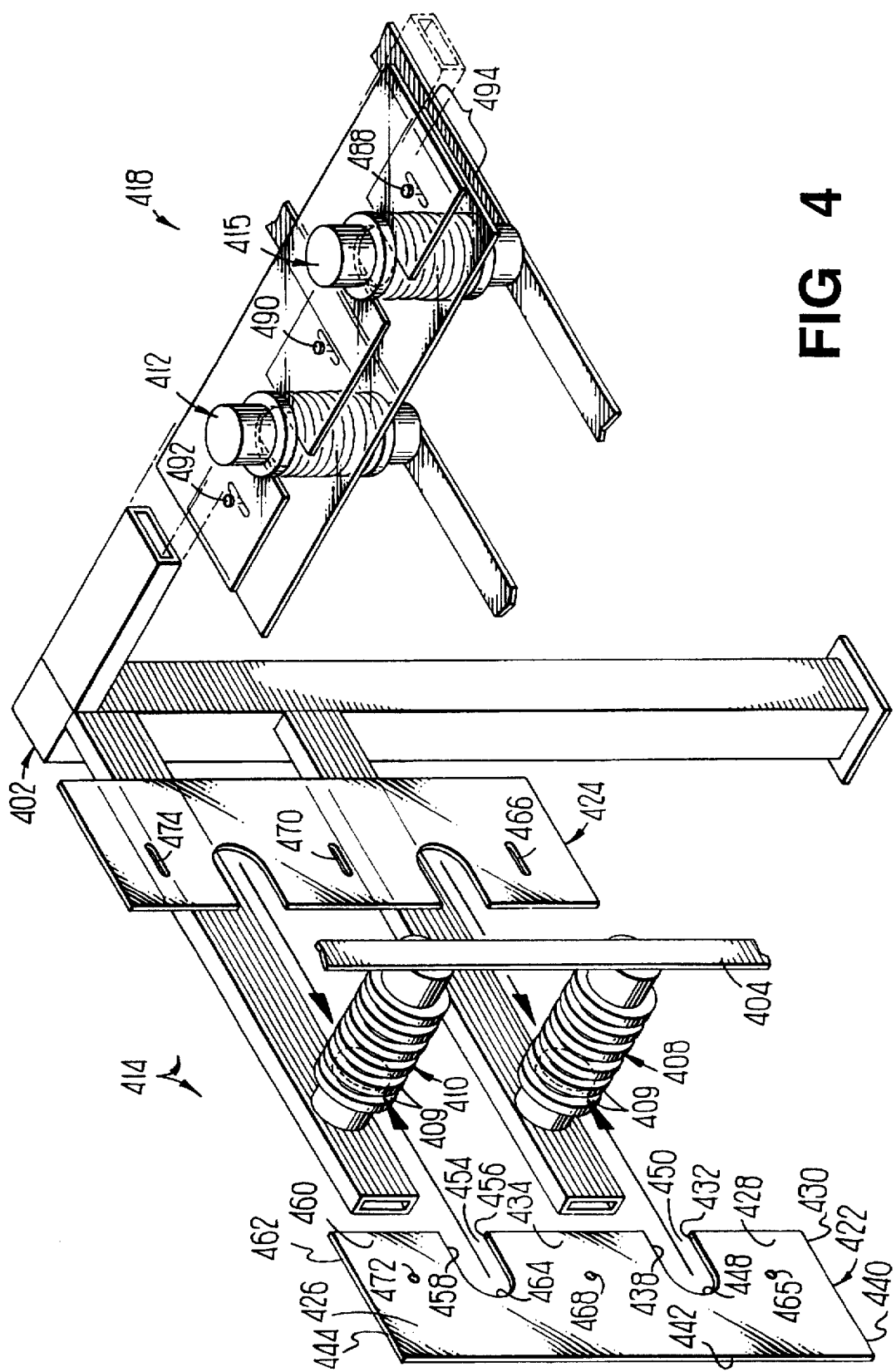
FIG. 4 is a perspective, exploded view of a fourth embodiment of a shield according to the present invention.

FIG. 4 illustrates a fourth embodiment of the present invention in which single shields 414 and 418 are adapted to fit onto any number of insulators which are close to one another on grounded structure 402. FIG. 4 illustrates two pairs of insulators; insulators 408 and 410 support conductor 404, and insulators 412 and 415 support separate conductors. This embodiment can include adaptations to accommodate any number of closely placed insulators by varying the number of slots in each element. Shield 414 is rectangular in shape after assembly. Shield elements 422 and 424 are similar in shape. Shield element 422 includes main portion 426 which is rectangular in shape and bordered by peripheral edges 440, 442, and 444. FIG. 4 illustrates horizontally mounted insulators 408 and 410 located in a vicinity of each other, therefore three extensions 428, 434 and 460 extend from main portion 426. Extension 428 is bordered longitudinally by outer and inner edges 430 and 432, respectively. Extension 434 is bordered by inner edges 438 and 456. Extension 460 is bordered by inner edge 458 and outer edge 462. Inner edges 432 and 438 and central edge 448 define slot 450 which is adapted to fit over insulator 408 between skirts 409 in a manner identical to the first embodiment illustrated in FIG. 1. Similarly, inner edges 456 and 458 and central edge 464 define slit 454 which is adapted to fit over insulator 410 between skirts 409. FIG. 4 also illustrates hole 465 and matching slot 466, hole 468 and matching slot 470 as well as hole 472 and matching slot 474 as fastening means between shield elements 422 and 424 at overlapping portion 494. Shield 418, shown mounted on vertical insulators 412 and 415 is secured by fasteners 488, 490, and 492 in hole-slot pairs on overlapping portion 494. Any appropriate fastening means may be used including screws, bolts and nuts, or pop rivets. Also, adhesive may be used to fasten shield elements together.

The embodiments disclosed in FIGS. 1 to 4 illustrate each element of a single shield to be substantially symmetrical. However, it should be noted that a single shield does not necessarily have to made from symmetrical elements. For example, a first shield element may have longer extensions and deeper slots while a corresponding second shield element may not have any slots. Furthermore, this shield may be rectangular, square, circular, or any other desired shape. Furthermore, any known means may fasten the elements around one or more insulators, thus the shield elements may or may not have hole-slot pairs on overlapping portions.

Figure 5:
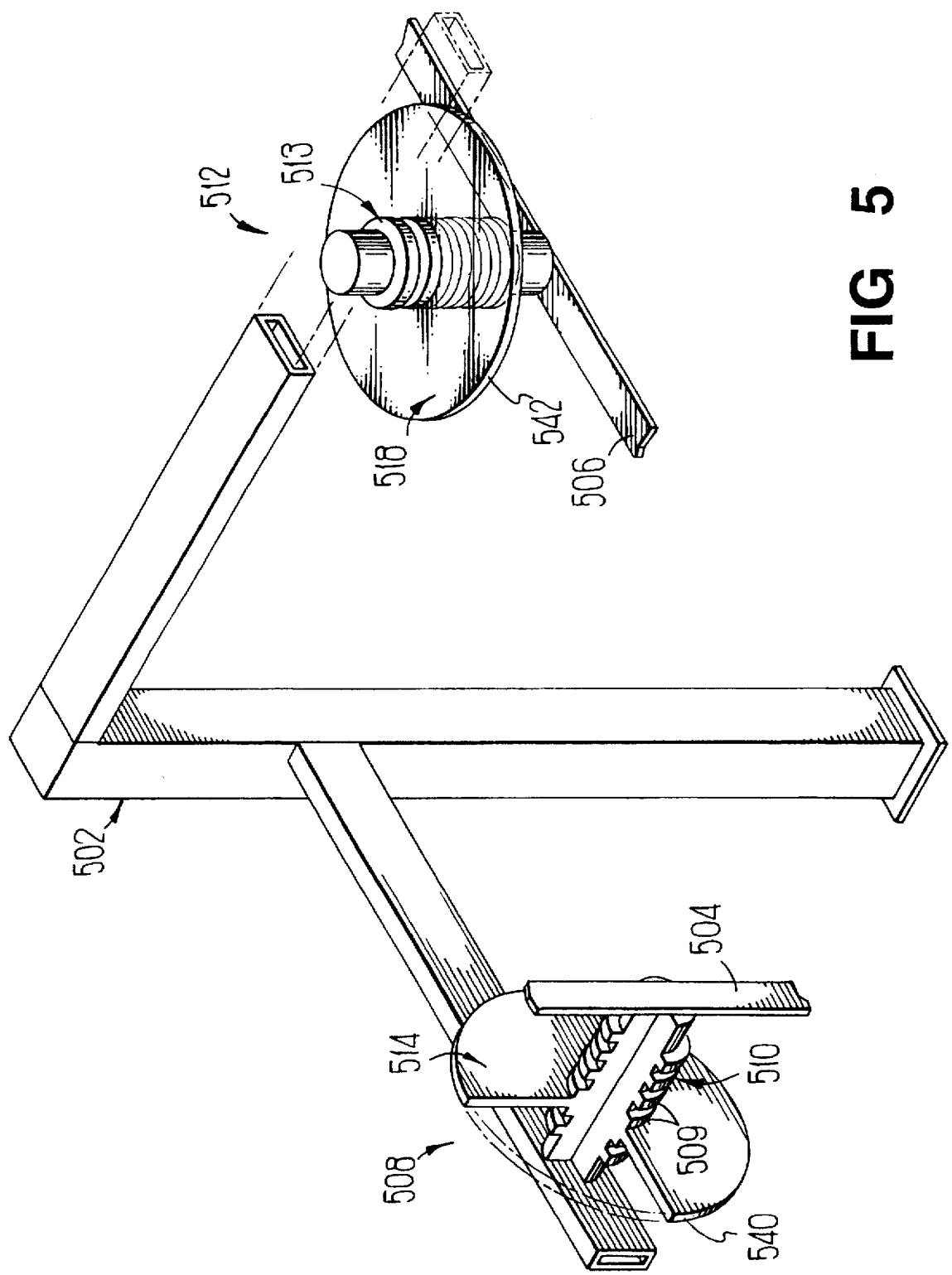
FIG. 5 is a perspective and partial cut-away view of a fifth embodiment of a shield according to the present invention.

FIG. 5 illustrates a fifth embodiment of the present invention. In this embodiment, an electrical insulator and a nonconducting shield are integrated into a unitary construction. Shielded insulators 508 and 512 have main bodies 510 and 513, respectively. Each of the main bodies 510 and 513 has a first end mounted on grounded structure 502 and a second end mounted on energized conductors 504 and 506, respectively. Between the first and second ends, shields 514 and 518 extend from the main bodies 510 and 513, respectively. Additionally, shielded insulators 508 and 512 also have radially extending skirts 509 extending from main bodies 510 and 513. Although shields 514 and 518 in FIG. 5 are circular, the radially extending shields 514 and 518 may have any shape. For example, shields 514 and 518 may be square, rectangular, octagonal, oval, or any other shape best suited for the particular environment in which the shielded insulators are used. Shields 514 and 518 are bordered by peripheral edges 540 and 542, respectively.

Figure 6:
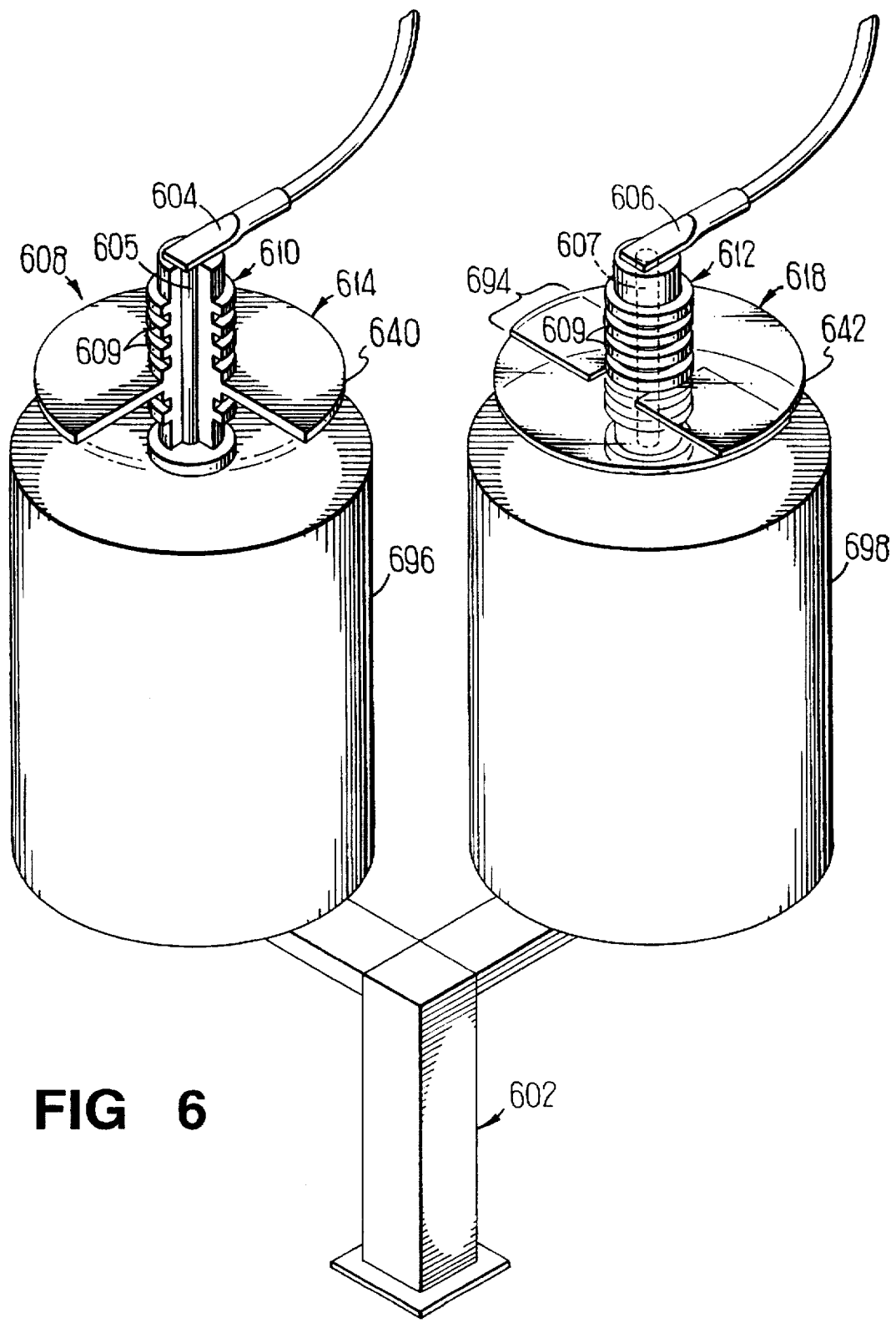
FIG. 6 is a perspective and partial cut-away view of a sixth embodiment of a shield according to the present invention.

FIG. 6 illustrates a sixth embodiment of the present invention. In this embodiment, a shield 614 is provided on a bushing between a conductor 604 and a grounded housing 696 of a breaker or transformer. A bushing differs from an insulator in that a bushing has a conductive core. Generally, a bushing is used to feed a cable lead into some device. For example bushing 608, provides an electrical connection 605 between a conductor 604 and a transformer or breaker (not shown) within housing 696, and insulates cable leads from a grounded housing 696 of the breaker or transformer. In this particular embodiment, a nonconducting bushing having a main body 610 and nonconducting shield 614 form an integrated, shielded bushing 608 having a unitary construction. The main body 610 has a first end mounted on grounded housing 696. The conductor 604 is mounted on a second end of main body 610. Between the first and second ends, shield 614 extends from the main body 610. Additionally, shielded bushing 608 has radially extending skirts 609 extending from main body 610. Although shield 614 in FIG. 6 is circular, it may be of any shape. For example, shield 614 may be square, rectangular, octagonal, oval, or any other shape best suited for the particular environment in which the shielded bushing is used.

Also as shown in FIG. 6, a shield of two elements may also be mounted onto a standard bushing 612. Bushing 612 has a first end mounted on grounded housing 698. A conductor 606 is mounted a second end of bushing 612. Conductor 606 is electrically connected to a breaker or transformer (not shown) within housing 698 via connector 607. Shield 618 includes two elements which are adapted to fit around bushing 612 between skirts 609. Overlapping portion 694 provides adequate space to fasten the two elements together by any known means.

Figure 7A:
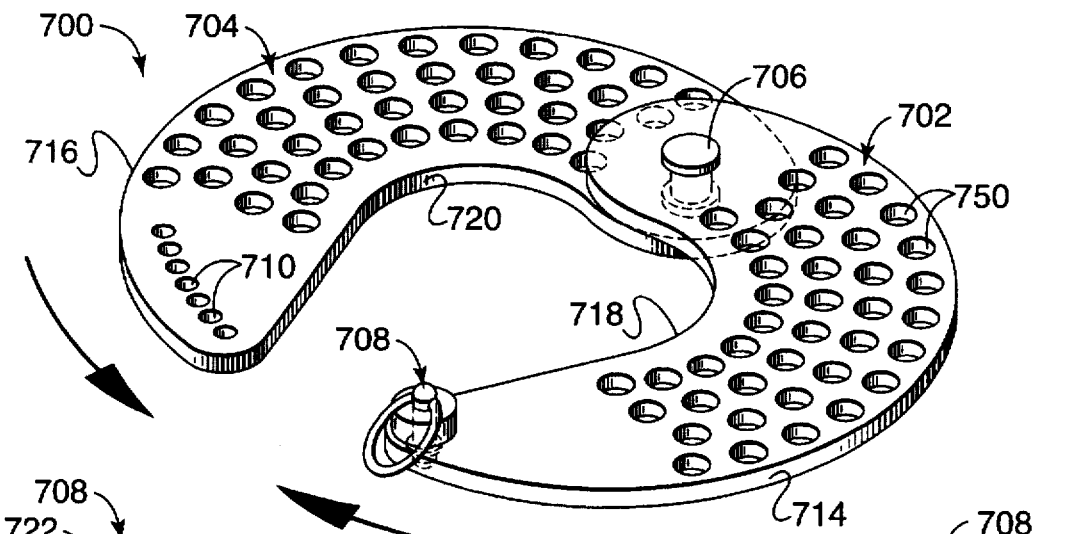
FIGS. 7A and 7D illustrate a perspective view of another embodiment of a shield according to the present invention.
Figure 7B:
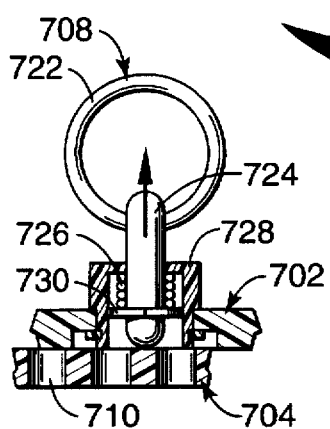
FIGS. 7B and 7C illustrate one possible example of a fastener for the shield embodiment illustrated in FIGS. 7A and 7D.
Figure 7C:
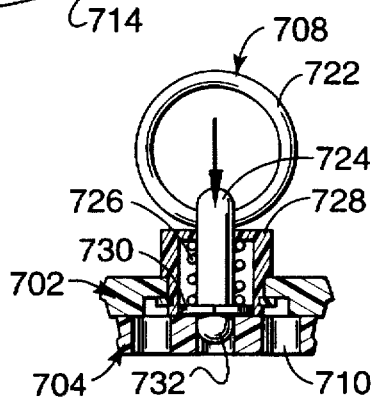
Figure 7D:
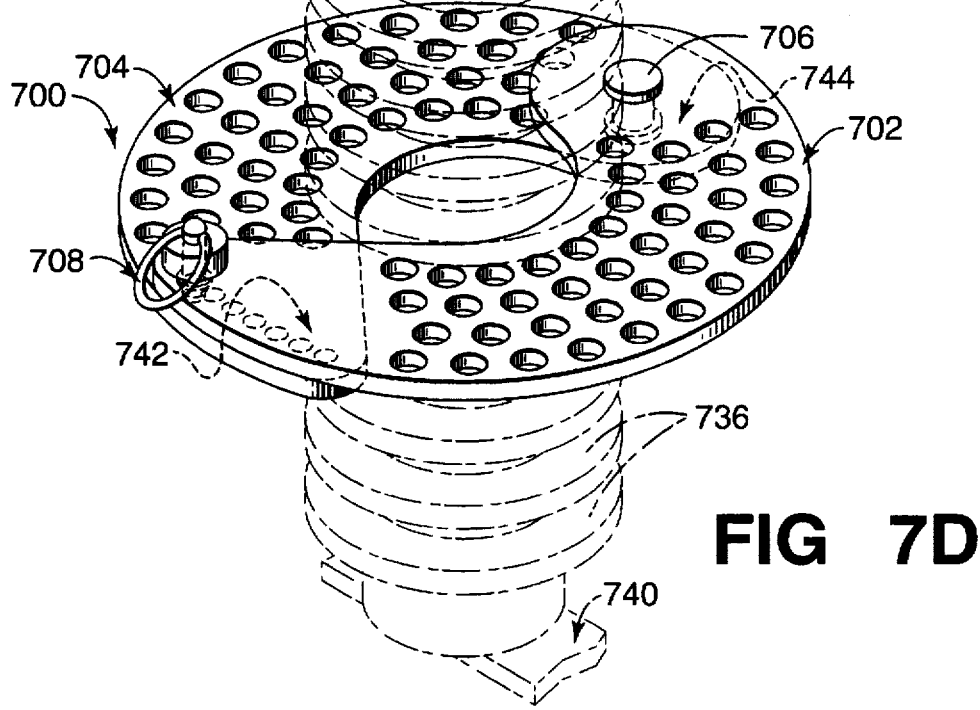

FIGS. 7A through 7D represent still another embodiment of a squirrel shield according to the present invention. Specifically, squirrel shield assembly 700 is comprised of shield elements 702 and 704. Hinge 706 pivotally fastens a first portion of shield element 704 to a first portion of shield element 702. Additionally, latch 708 releasably engages any one of detents 710 to securably fasten shield assembly 700 around an intermediary device 734 as is illustrated in FIG. 7D. Specifically, latch 708 is comprised of a gripping ring 722, rod 724 and spring 726. Spring 726 engages a top portion of housing 728 and a top portion of retaining ring 730 to bias rod 724 into any one of apertures 710. Additionally, rod 724 includes a rounded edge 732 so that the rod 724 may smoothly engage any one of detents 710. FIG. 7B illustrates latch 708 in an upward position where rounded end 732 contacts a surface of shield element 704 and FIG. 7C illustrates the latch 708 in an extended position with rounded edge 732 engaging one of apertures 710. In a preferred embodiment, shield assembly 700 may be comprised of an opaque or transparent polymeric sheet material having an anti-ultraviolet radiation degradation filler package incorporated therein. If formed from an opaque material, a plurality of site apertures 750 are incorporated into the shield assembly and allow a field technician to see various structures behind the squirrel shield 700. Each shield element 702 and 704 of shield assembly 700 comprises peripheral edge proportions 714 and 716 as well as inside edges 718 and 720. Generally, inside edges 718 and 720 are adapted to fit between skirts 736 of intermediary device 734, as FIG. 7D illustrates. After a technician rotates shield element 702 into shield element 704 around intermediary device 734, overlapping portions 742 and 744 are created as is illustrated in FIG. 7D.

After shield assembly 700 properly engages intermediary device 734, peripheral edges 714 and 716 are adapted to be sufficiently distant from inside edges 718 and 720 as well as an outer periphery of skirts 736 so as to prevent a small animal from simultaneously contacting a ground structure 738 and an energized conductor 740 when traversing the intermediary device 734. Additionally, the plurality of detents 710 allow the outer periphery of the shield assembly 700 to be adjusted with respect to the outer periphery of skirt 736 and intermediary device 734.

Figure 8A:
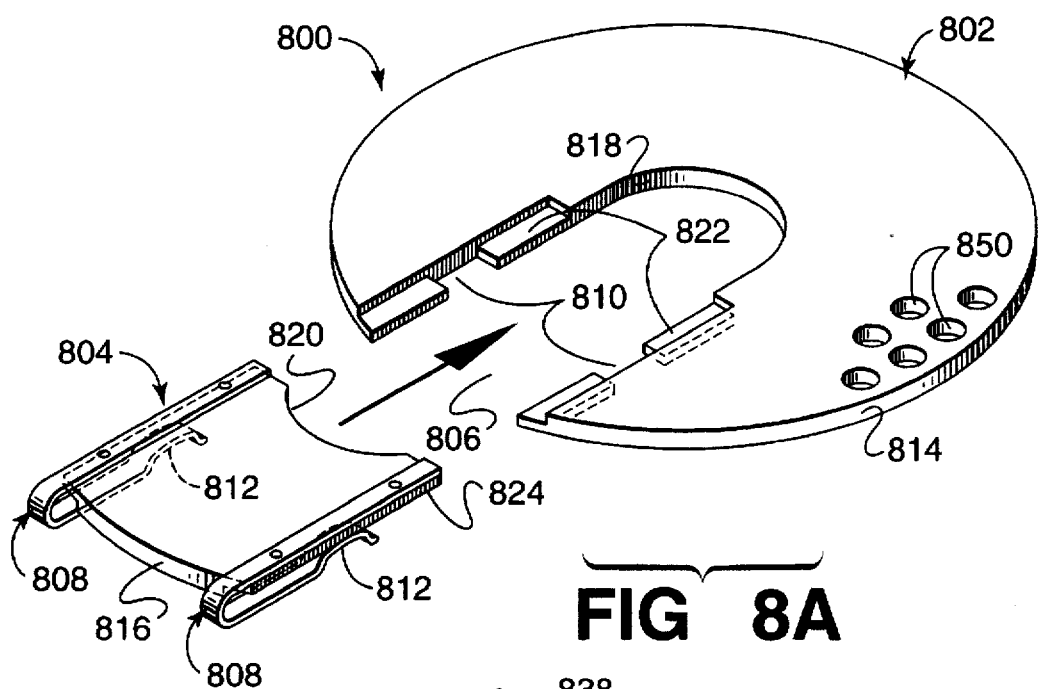
FIGS. 8A and 8B illustrate a perspective view of still another embodiment of a shield according to the present invention.
Figure 8B:
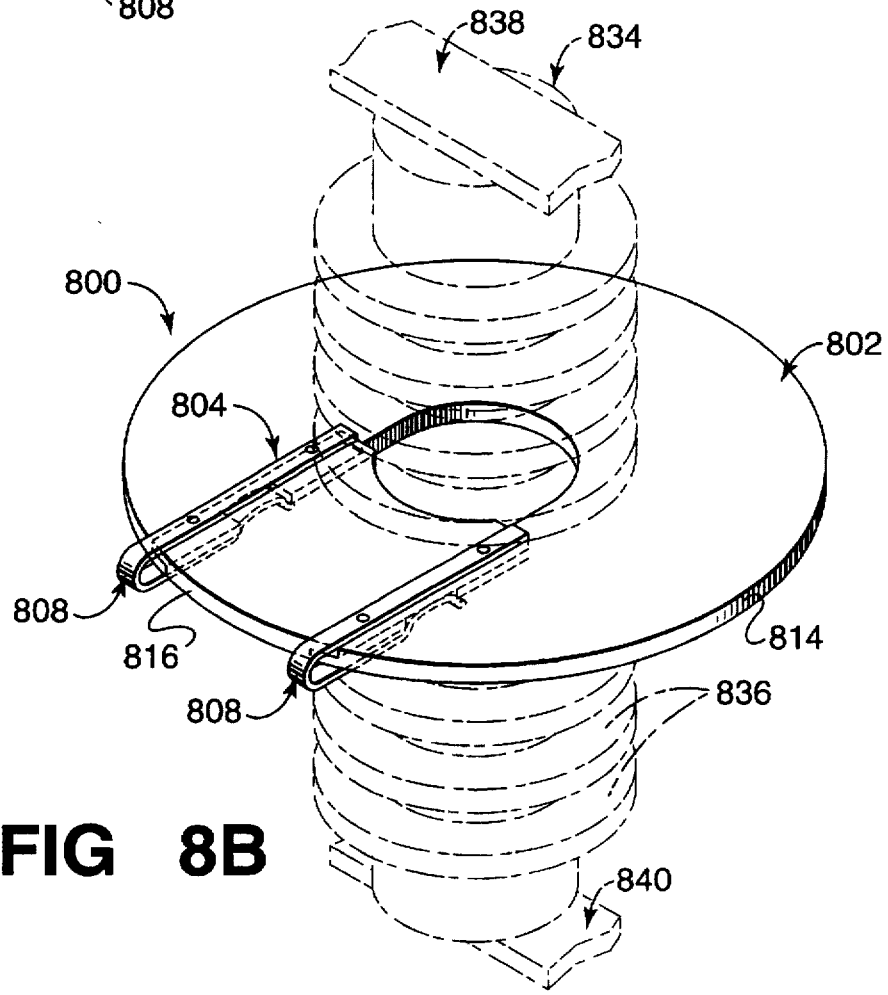

FIGS. 8A and 8B represent still another embodiment of the squirrel shield according to the present invention. Specifically, shield assembly 800 is comprised of a first shield element 802 and a second element 804 which slidably engages shield element 802. Shield element 802 is essentially circular in shape, however, it may be comprised of any suitable shape which accomplishes the objectives of the present invention. Shield element 802 contains outer periphery 814 and inside edge portion 818. Shield element 804 also includes a peripheral edge portion 816 and an inside edge portion 820.

Shield element 804 contains a latch assembly 808 disposed on longitudinal edges thereof which is adapted to slidingly engage corresponding portions of shield element 802 within slot 806. Each latch 808 includes a protrusion 812 which engages a detent 810 on an inside edge portion of shield element 802. Specifically, recessed edges 824 of on a bottom surface of shield element 804 engage recessed edges 822 on a top surface of inside edge 818 on shield element 802. When shield element 804 slides onto shield element 802, protrusions 812 engage detents 810 and removably fasten shield element 804 to shield element 802 to fasten the entire assembly 800 around an intermediary device 834 as is illustrated in FIG. 8B.

Peripheral edges 814 and 816 of shield assembly 800 are sufficiently distant from inside edges 818 and 820 as well as a peripheral edge of skirts 836 on intermediary device 834 to prevent a small animal from simultaneously contacting a grounded structure 838 and an energized conductor 840 when traversing the intermediary device 834. Additionally, shield element 800 may also be constructed of a transparent or opaque sheet polymer which includes means for preventing ultraviolet light degradation. Finally, if shield assembly 800 is opaque, it may also include a plurality of site apertures 850 for allowing a field technician to see structure which is arranged on an opposite side of the shield assembly 800.

FIGS. 9A through 9E illustrate still another embodiment of the present invention which is adapted to facilitate placement of the shield assembly 900 onto an intermediary device 932 between skirts 934. Specifically, shield assembly 900 is comprised of shield element 902, shield element 904, and shield element 906, which may include sight apertures 950. Shield elements 904 and 906 are rotatingly fastened to shield element 902 via hinges 908 and 910, respectively. Shield element 902 includes a peripheral edge portion 914 and an inside edge portion 920 which defines a longitudinal slot 938. Longitudinal slot 938 is sufficiently wide so as to allow shield element 902 to be mounted onto an intermediary device 934 between skirts 932 as is illustrated in FIGS. 9B through 9E.

Shield element 904 also includes a peripheral edge portion 916 as well as an inside edge portion 922. Similarly, shield element 906 includes a peripheral edge portion 918 as well as an inside edge portion 924. As explained above, each of shield elements 904 and 906 are rotatingly mounted on shield element 902 and may be rotated against the bias of springs 926 and 928, respectively, when the shield assembly 900 is slidably mounted onto an intermediary device 934.

FIGS. 9B through 9E illustrate the sequence of relative shield element motions when shield assembly 900 is mounted onto an intermediary device 934 between skirts 936. Referring to FIG. 9B, as the shield assembly 900 approaches the intermediary device 934, peripheral edge portions 916 and 918 engage the intermediary device between skirts 936 and are rotated away from the intermediary device with respect to shield element 902 as is illustrated in FIG. 9C. When the shield element reaches the end of longitudinal slot 938, shield elements 904 and 906 then rotate back to their original positions and provide a complete periphery around the intermediary device 932. This arrangement facilitates extremely easy placement of the shield assembly 900 onto intermediary device 932 without disassembly of the power distribution substation or the power interruption during a shield assembly mounting procedure.

Shield assembly 900 may be constructed from polymeric sheet material. Additionally, the polymer may include an anti-ultraviolet radiation degradation package. If shield assembly 900 is comprised of an opaque material, a plurality of site apertures 950 may be provided on any of the shield elements to facilitate site of additional equipment in the power distribution substation after the assembly is mounted onto an intermediary device.

Figure 10A:
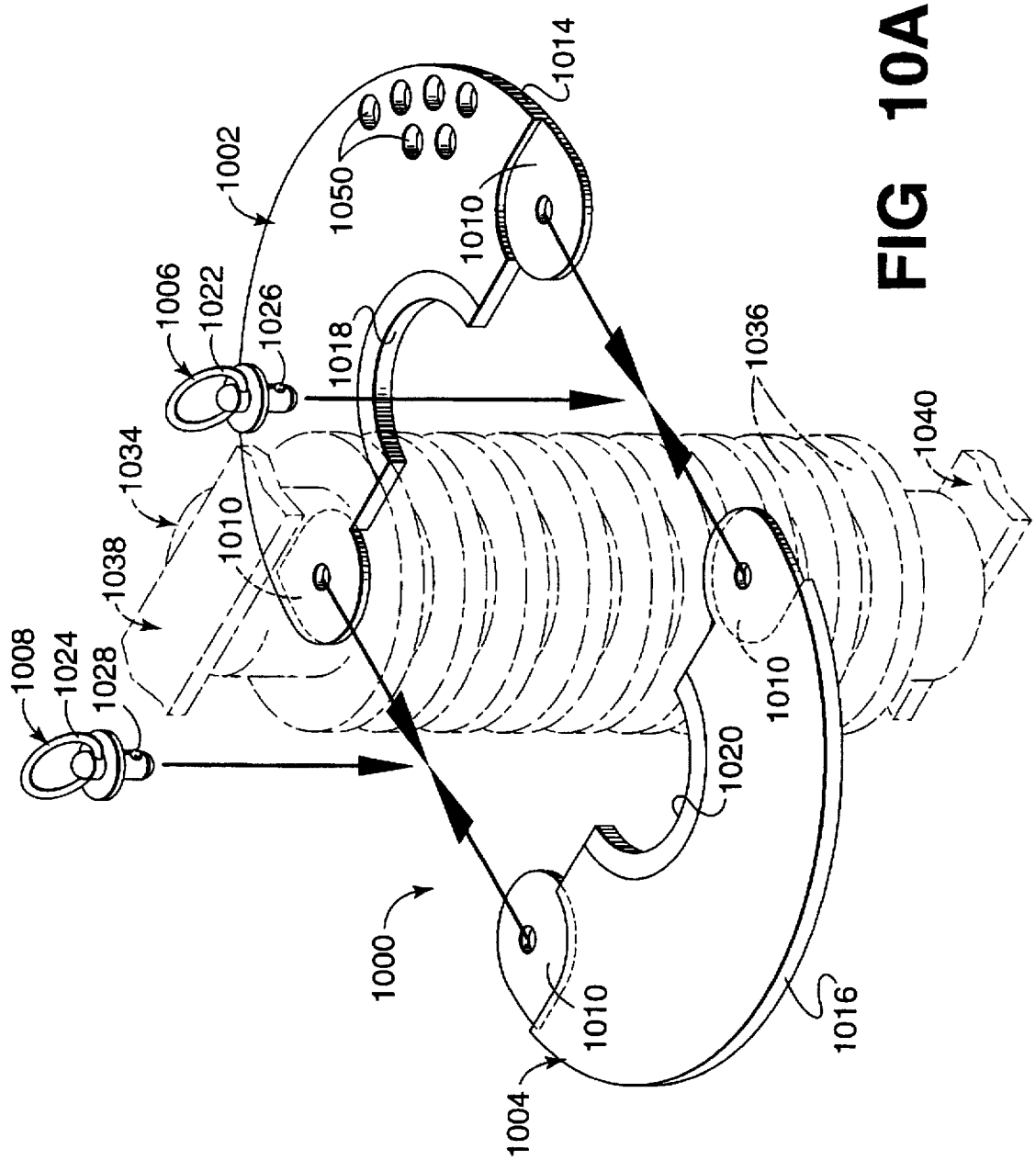

FIGS. 10A and 10B illustrate yet another embodiment of the shield assembly according to the present invention. Specifically, shield assembly 1000 is comprised of shield elements 1002 and 1004 which are rotatably connected to each other via latches 1006 and 1008. Additionally, each shield element may include a recess 1010 in the vicinity of each latch to allow shield elements 1002 and 1004 to cooperate with each other.

More specifically, each of latches 1006 and 1008 may be comprised of gripping rings 1022 and 1024 and locking protrusions 1026 and 1028 so as to fasten the shield elements 1002 and 1004 together. Thus, the shield elements overlap one another and are rotatably fastened together between protrusion 1028 and washer 1030 at latch 1024. Similarly, the shield elements may also overlap one another and are rotatably fastened together between protrusion 1026 and washer 1032 at latch 1022. Protrusions 1026 and 1028 may be compressed into their respective latches for disassembly of the shield.

FIG. 10B illustrates the shield assembly 1000 arranged around an intermediary device 1034 between skirts 1036. As is illustrated, one portion on each of shield elements 1002 and 1004 may be latched together and the other ends rotated into engagement and fastened together with a second latch 1022. Additionally, shield assembly 1000 may be transparent or opaque. If shield elements are opaque, they may contain a plurality of site apertures 1050 for allowing a technician to view other components in the vicinity of intermediary device 1034. Additionally, shield elements 1002 and 1004 include peripheral edges 1014 and 1016 as well as inside edge portions 1018 and 1020. Finally, peripheral edge portions 1014 and 1016 are also sufficiently distant from inside edge portions 1018 and 1020 as well as an outer periphery of skirts 1036 of intermediary device 1034 so as to prevent a small animal from simultaneously contacting surrounded structure 1038 and energized conductor 1040 when traversing intermediary device 1034.

Figure 11A:
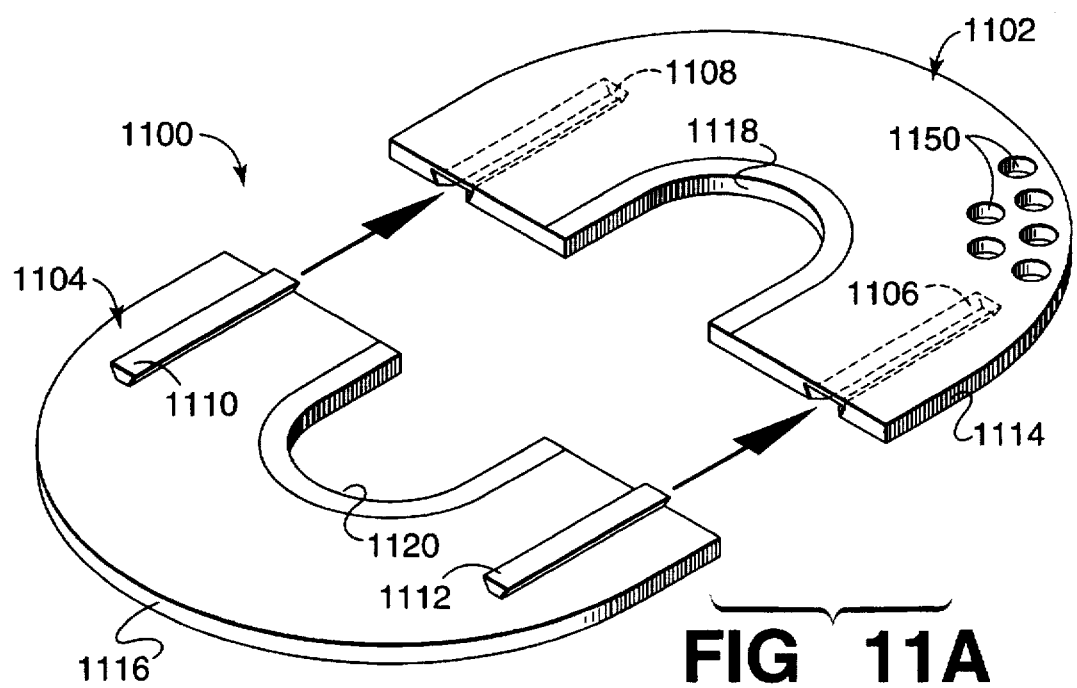
FIGS. 11A–11C illustrate a perspective view of still another embodiment of a shield according to the present invention.
Figure 11B:
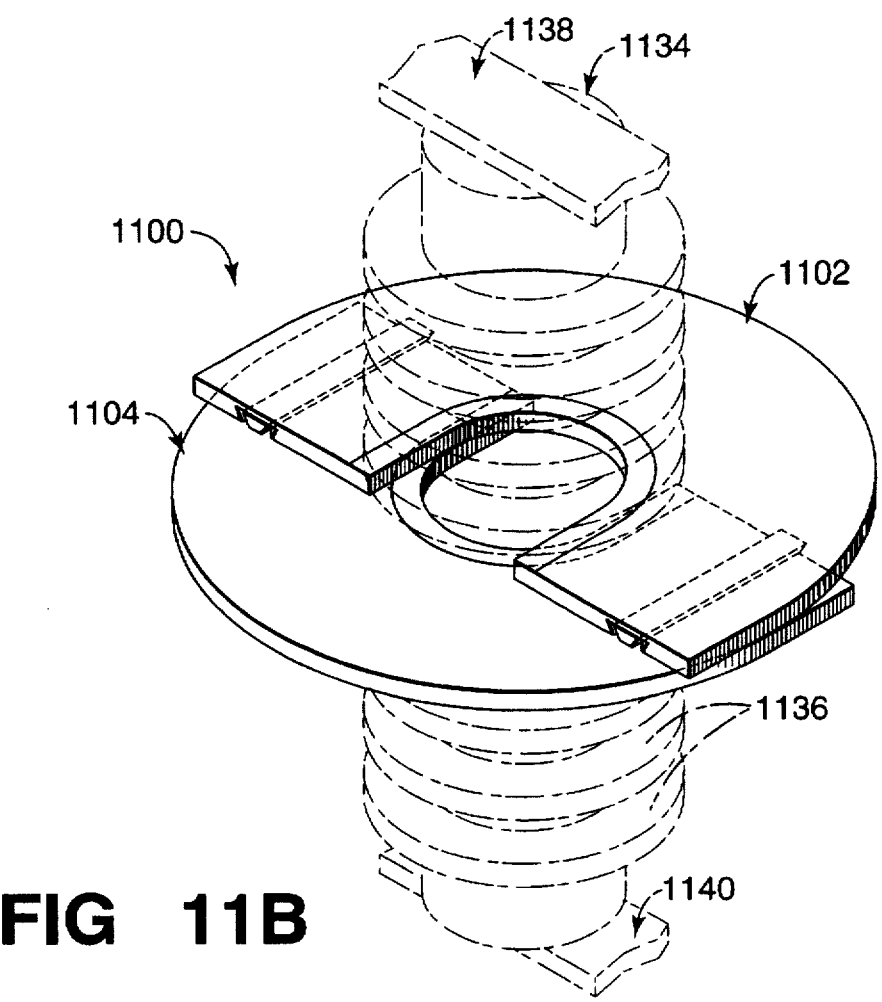

FIGS. 11A and 11B illustrate yet another embodiment of the present invention. Shield assembly 1101 utilizes matching elongated depressions and protrusions for fastening shield assembly 1100 around intermediary device 1134. Specifically, shield assembly 1100 is comprised of shield elements 1102 and 1104. Shield elements 1102 and 1104 also include peripheral edge portions 1114 and 1116 as well as inside edge portions 1118 and 1120. Elongated protrusions 1110 and 1112 on shield element 1116 slidingly engage elongated depressions 1108 and 1106 on shield element 1102 in order to fasten shield assembly 1100 around intermediary device 1134.

As is illustrated in FIG. 11B, inside edges 1118 and 1120 are adapted to fit between skirts 1136 of intermediary device 1134. Additionally, peripheral edge portions 1114 and 1116 are sufficiently distant from inside edge portions 1118 and 1120 and a peripheral edge of skirts 1136 so as to prevent a small animal from simultaneously contacting a grounded structure 1138 and an energized conductor 1140 when traversing intermediary device 1134.

Figure 11C:
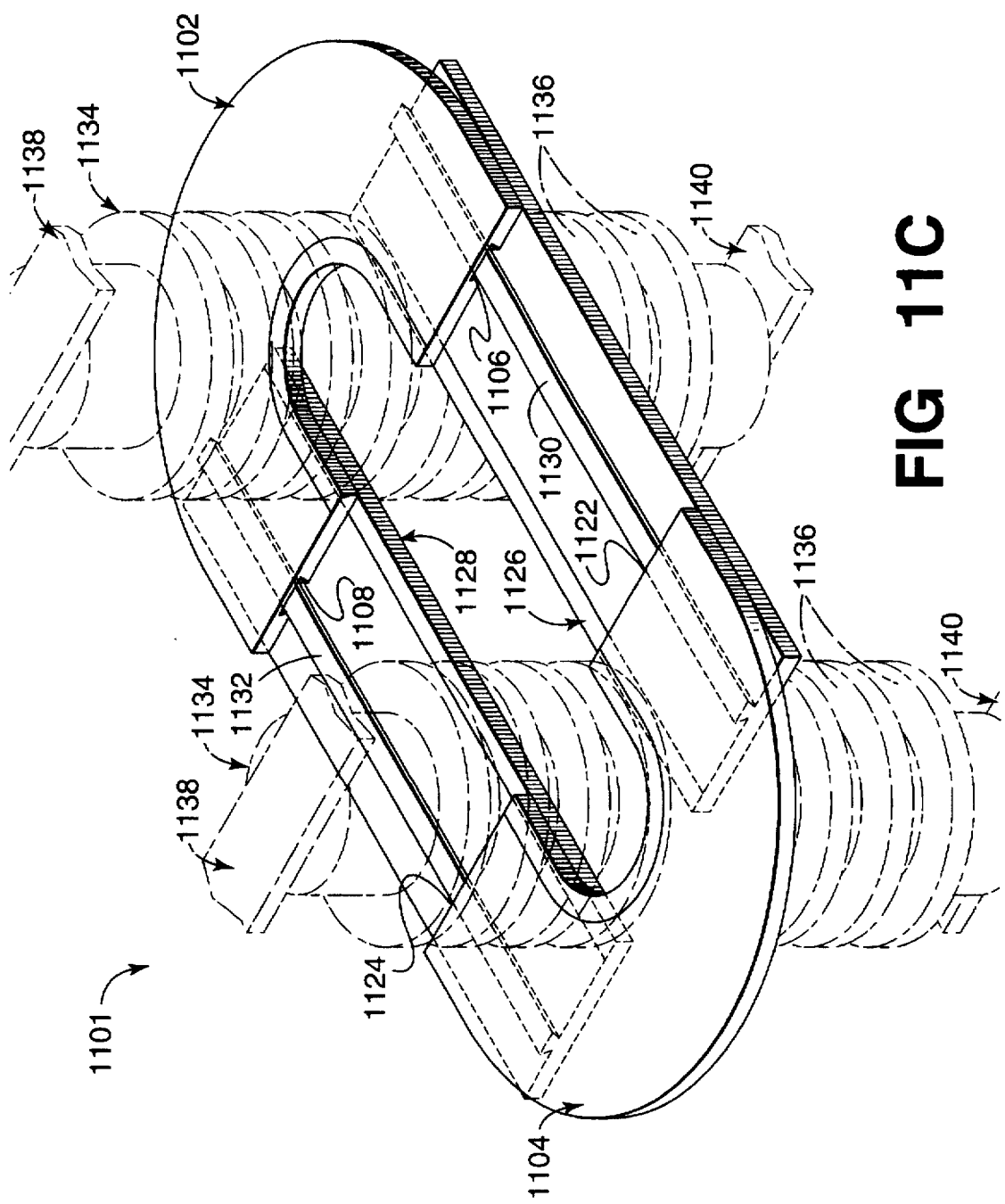
Figure 13D:
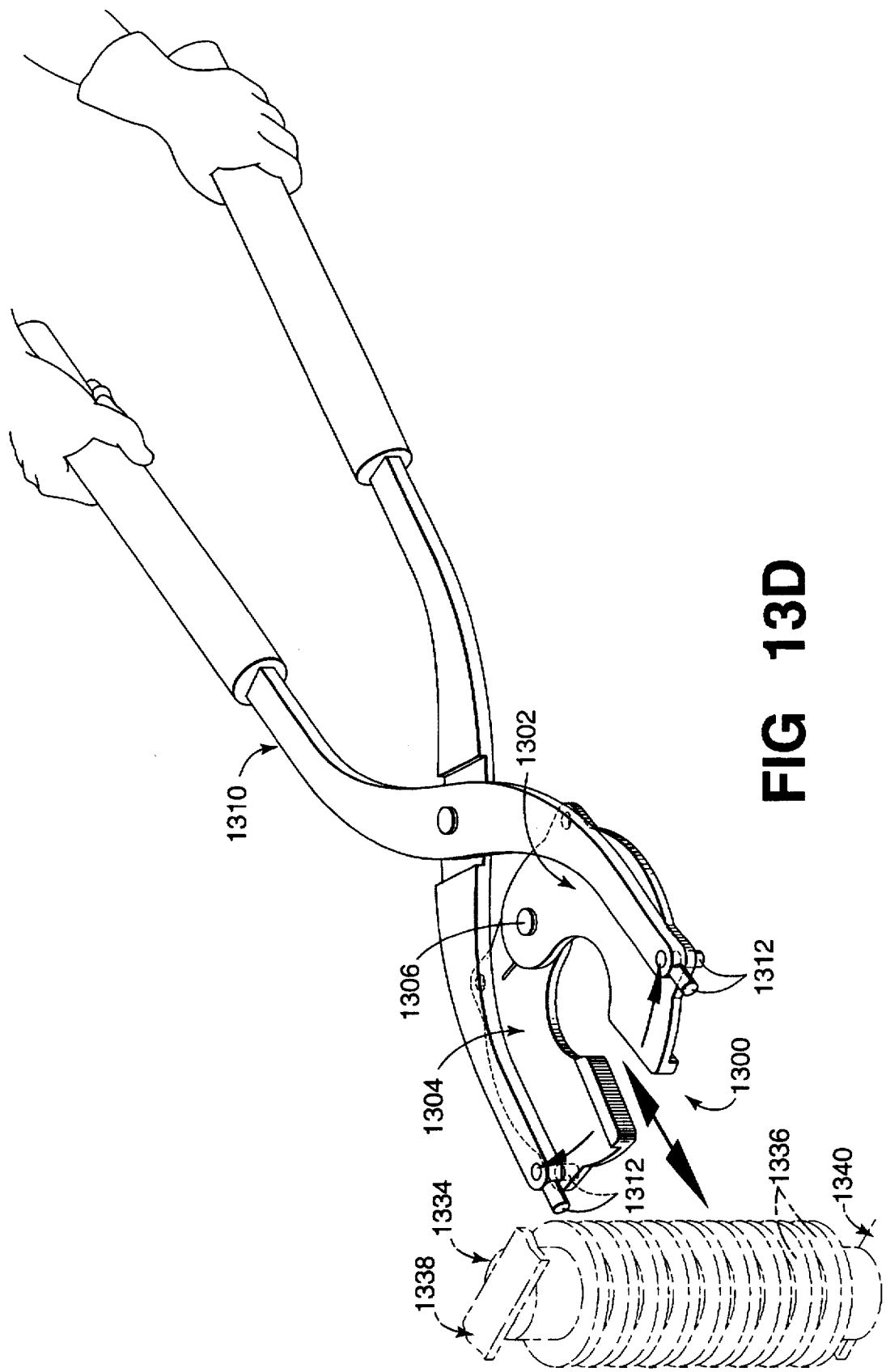

FIG. 11C illustrates an additional embodiment which employs extensions 1126 and 1128 between shield elements 1102 and 1104. In this configuration, shield elements 1102 and 1104 both contain longitudinal depressions 1106, 1108, 1122 and 1124 for receiving longitudinal protrusions 1130 and 1132 from extensions 1126 and 1128. Generally, this embodiment is adapted to extend the shield between two adjacent intermediary devices 1134. Extensions 1136 and 1128 extend an outer peripheral edge portion of the shield assembly so as to prevent an animal from simultaneously contacting a grounded structure 1138 and energized conductor 1140 simultaneously when traversing any intermediary device within the shield. The shield assemblies set forth in FIGS. 11A through 11C may be transparent or opaque and may also include means for protecting the shield elements from degradation due to ultraviolet light radiation. If the shield elements are opaque, they may also include site apertures 1150 for viewing componentry in the vicinity of the shield assemblies.

FIGS. 12A–12B illustrate still another embodiment of the present invention. Specifically, shield assembly 1200 is comprised of shield elements 1202 and 1204. Hinge 1206 rotatingly connects shield element 1202 to 1204. Additionally, torsion spring 1208 biases shield element 1202 into shield element 1204. Shield assembly 1200 also contains peripheral edge portions 1214 and 1216 as well as inside edge portions 1218 and 1220. Finally, shield assembly 1200 contains tapered portions 1210 and 1212 on forward portions thereof for facilitating the placement of shield assembly 1200 around intermediary device 1234 between skirts 1236. As in all other embodiments, peripheral edge portions of shield assembly 1200 are sufficiently distant from its inside edge portions and peripheral edges of skirts 1236 to prevent a small animal from simultaneously contacting a grounded structure 1238 and an energized conductor 1240.

FIGS. 12B to 12E illustrate the sequence of actions involved in placement of the shield assembly 1200 onto intermediary device 1234. During a mounting sequence, tapered edge portions 1210 and 1212 engage the intermediary device 1234 and spread shield elements 1202 and 1204 away from each other and against the bias of spring 1208 as is illustrated in FIG. 12C. When the shield assembly has been placed all the way onto the intermediary device 1234, the bias of spring 1208 forces inside edges 1218 and 1220 into engagement with the intermediary device 1234 between skirts 1236. Finally, a technician may easily remove the shield assembly 1200 from intermediary device 1234 by simply pulling the assembly away from the intermediary device to once again spread the shield elements 1202 and 1204 away from each other. Shield assembly 1200 is extremely advantageous for its easy placement in a power distribution substation since it does not require disassembly of the substation, interruption of power or assembly of the shield assembly.

Finally, shield assembly 1200 may be constructed of a transparent or opaque sheet polymer material. The polymer may also include means for protecting itself from degradation from ultraviolet radiation. If the shield elements are opaque, they may also include a plurality of site apertures 1250 for facilitating viewing of various componentry in the vicinity of the shield assembly 1200 after it has been mounted onto an intermediary device.

FIGS. 13A through 13D represent still another embodiment of the present invention. Specifically, shield assembly 1300 also includes shield elements 1302, 1304, as well as peripheral edge portions 1314 and 1316. Shield assembly 1300 also includes inside edges 1318 and 1320 as well as a plurality of mounting apertures for spreading the shield assembly apart against the bias of spring 1308. Specifically, mounting tool 1310 includes a plurality of mounting protrusions 1312 which may engage any one of mounting apertures 1322, 1324, 1326 and 1328 to spread the shield assembly 1300 apart against the bias of spring 1308 to mount shield assembly 1300 onto intermediary device 1334 between skirts 1336. When shield assembly 1300 has been mounted onto the intermediary device, edges 1332 and 1330 engage one another from the bias of spring 1308.

As in all other embodiments, peripheral edge portions of shield assembly 1300 are sufficiently distant from its inside edge portions and peripheral edges of skirts 1336 to prevent a small animal from simultaneously contacting a grounded structure 1338 and an energized conductor 1340.

Shield assembly 1300 may be constructed of a transparent or opaque sheet polymer material. The polymer may also include means for protecting itself from degradation from ultraviolet radiation. If the shield elements are opaque, they may also include a plurality of site apertures 1350 for facilitating viewing of various componentry in the vicinity of the shield assembly 1300 after it has been mounted onto an intermediary device.

FIGS. 14A through 14B illustrate still another embodiment of the shield assembly according to the present invention. Specifically, shield elements 1402 and 1404 include extensions 1442 and 1444, respectively, for facilitating the mounting of shield element 1400 onto intermediary device 1434 between skirts 1436. Shield assembly 1400 also includes peripheral edge portions 1414 and 1416 as well as inside edge portions 1418 and 1420. Additionally, extensions 1442 and 1444 include mounting apertures 1424 and 1428 for accepting mounting protrusions 1412 on tool 1410. Furthermore, shield elements 1402 and 1404 also include mounting protrusions 1422 and 1426, and site apertures 1450.

Figure 14D:
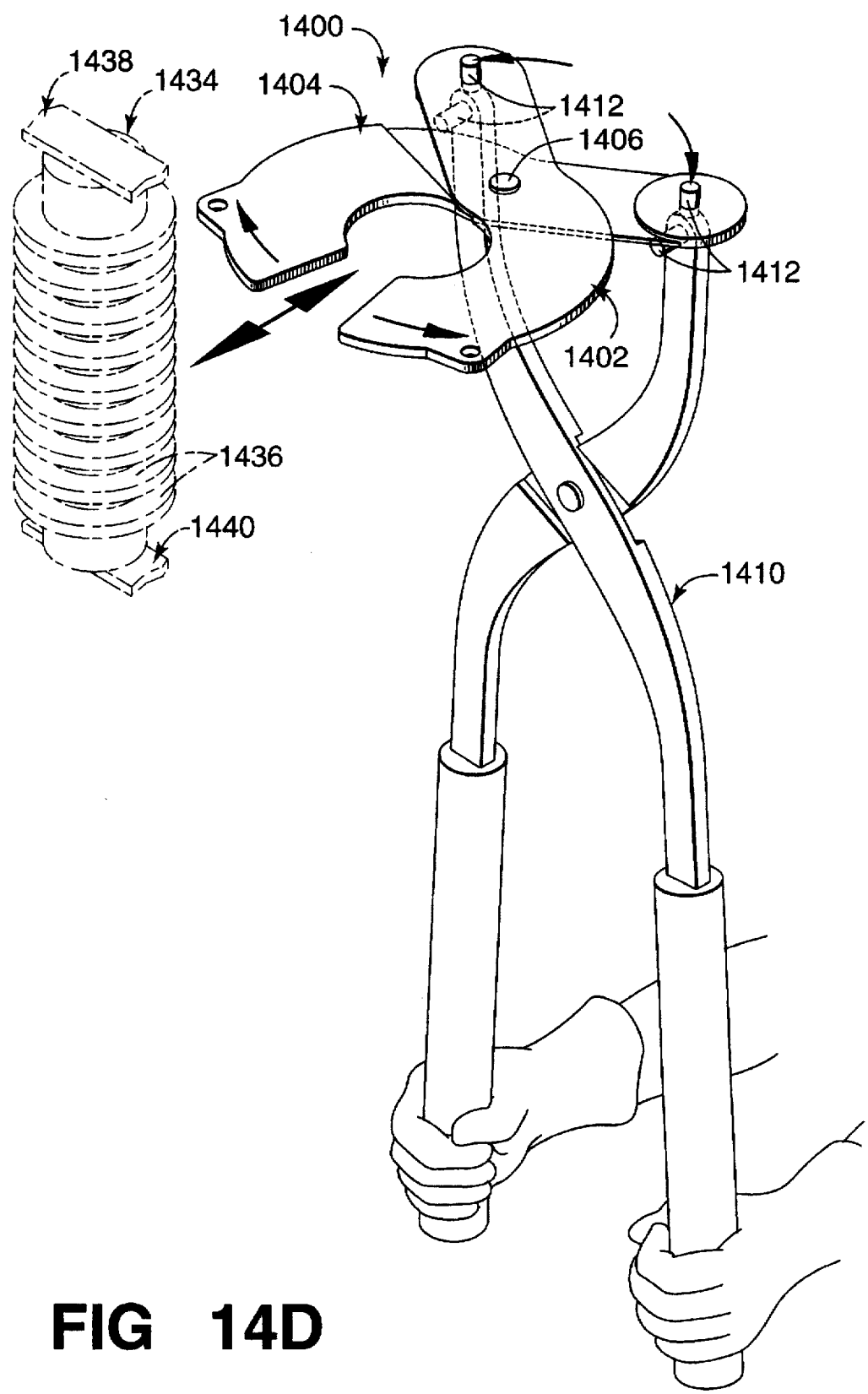

FIGS. 14B–14D illustrate the mounting procedure for mounting shield assembly 1400 onto intermediary device 1434 between skirts 1436. Tool 1410 spreads extensions 1442 and 1444 apart and opens the assembly for placement around the intermediary device. Similar to the other embodiments, all peripheral edges of the shield assembly 1400 are sufficiently distant from inside edge portions and from peripheral edge portions of skirts 1436 to prevent a small animal from simultaneously contacting grounded structure 1438 and energized conductor 1440 when traversing intermediary device 1434.

Shield assembly 1400 may be also constructed of a transparent or opaque sheet polymer material. The polymer may also include means for protecting itself from degradation from ultraviolet radiation. If the shield elements are opaque, they may also include a plurality of site apertures 1450 for facilitating viewing of various componentry in the vicinity of the shield assembly 1400 after it has been mounted onto an intermediary device.

Shield unit 1500, illustrated in FIGS. 15A–15E, represents yet another embodiment of the present invention. This embodiment is comprised of a single unitary piece which is preferably stamped from a sheet of opaque or transparent polymer. Specifically, the shield assembly 1500 includes peripheral edges 1514, 1516, as well as inside edge portions 1518 and 1520 which border central aperture 1504. Also, tapered edge portions 1510 and 1512 expand outward from slit 1502 and are adapted to engage exterior an portion of the intermediary device 1534 between skirts 1536 such that portions of the shield are spread apart via slit 1502. If shield assembly 1500 is comprised of an opaque polymer material and the assembly may also include a plurality of site apertures 1550 for viewing componentry in the vicinity of the intermediary device 1534.

Several features of shield unit 1500 enhance its circumferential flexibility to facilitate placement around an intermediate device 1534. First, shield unit 1500 may include an flex aperture 1506 between its inside edge portions and the peripheral edge portions, opposite the tapered portions 1512 and 1510. Aperture 1506 creates a flexible portion near a peripheral edge portion of shield unit 1500, which allows the unit to expand around the intermediate device.

Similar to the other embodiments, all peripheral edges of the shield unit 1500 are sufficiently distant from inside edge portions 1518 and 1520 and from peripheral edge portions of skirts 1536 to prevent a small animal from simultaneously contacting grounded structure (not shown) and energized conductor (not shown) when traversing intermediary device 1534.

Shield assembly 1500 may be also constructed of a transparent or opaque sheet polymer material. The polymer may also include means for protecting itself from degradation from ultraviolet radiation. If the shield elements are opaque, they may also include a plurality of site apertures 1550 for facilitating viewing of various componentry in the vicinity of the shield assembly 1500 after it has been mounted onto an intermediary device.

The shield embodiments illustrated in FIGS. 1 through 4 and 7 through 15 are adapted to be placed on existing intermediary devices (e.g., switch and bus insulators) since intermediary devices are primary points of contact when small animals climb on power distribution substations. These embodiments therefore provide for a barrier on existing switch and bus insulators and prevent animals from simultaneously contacting a grounded structure and an energized conductor, thus eliminating a ground path from the energized conductor through the animal to the grounded structure.

The shielded insulators disclosed in FIG. 5 replace existing insulators in a substation, can be used in the construction of a new substation, and also prevent a small animal from simultaneously contacting a grounded structure and a conductor. Similarly, shielded bushing 608 disclosed in FIG. 6 replaces existing bushings in a substation and may be used in the construction of a new substation.

Although shielded insulators 508 and 512 and shielded breaker 608 can be constructed from any durable, non-conducting material, they are preferably fabricated from a strong, moisture resistant polymer. The polymer must also be capable of resisting degradation from ultraviolet radiation associated with sunlight. Additionally, the polymer must withstand high temperatures for short durations should occasional arcing between the conductor and grounded structure occur. Also, the shielded insulator may be fabricated from a fiber reinforced polymer composite for added strength.

Moreover, a polymer which exhibits compliance near the peripheral edges 540, 542, and 640 is desirable since shield overlapping may occur when several shielded insulators are mounted close to one another. Furthermore, shielded insulators and shielded bushings can be manufactured having several possible axial locations for the shield. Shielded insulators and shielded bushings having dissimilar axial shield locations can be mounted close to one another to eliminate physical shield interference. As illustrated by FIG. 5, the shielded insulators 508 and 512 may be opaque or transparent. Finally, shielded bushing 608 may also be transparent or opaque.

Although the shield assemblies illustrated in FIGS. 1–4 and 7–15 may be constructed from any material, a nonconducting thermoplastic polymer may also be preferred. However, thermosetting resins as well as fiber reinforced polymer composites may also be utilized in any or all components of the shield assemblies discussed above. As previously mentioned the polymer should include some means for protecting itself from degradation from sunlight. Thus, protectant coatings or fillers within the sheet polymer are preferred. Additionally, all hinges, springs, or other devices used to fasten the various shield elements within a shield assembly are preferably constructed from a nonconducting material such as a polymer, to prevent static charges from being conducted in the vicinity of any energized conductors.

When a small animal such as a squirrel traverses grounded structure 102 of FIG. 1 and approaches insulator 108, the squirrel must also traverse the shield 114 to come into contact with conductor 104. The distance between the peripheral edge 140 of shield 114 and a peripheral edge of the skirt 109 is sufficient to force the squirrel to break contact with the grounded structure to move from the shield 114 to the conductor 104. In other words, the shield prevents the squirrel from making contact with the grounded structure and a conductor simultaneously. Since the shields are constructed of nonconducting material fastened to a porcelain insulator, no path to ground is provided whenever the squirrel is in contact with either the grounded structure and shield or the shield and conductor. If the squirrel attempts to reverse its path, the squirrel must break contact with the conductor to traverse from the shield to the grounded structure. Additionally, square shield 214 illustrated in FIG. 2 is of sufficient width so as to prevent the squirrel from contacting both the conductor 204 and the grounded structure 202 simultaneously. Also, the embodiment illustrated in FIG. 3 provides an even wider barrier for a squirrel or small animal to traverse since peripheral edges of adjacent shields overlap at portions 319. For example, the overlapping arrangement of adjacent shields embodied in FIG. 3 is very useful for providing a barrier between the grounded supporting structure and a disconnect switch mounted on two insulators.

Moreover, the embodiment illustrated in FIG. 4 also provides for a widened barrier across multiple insulators using only two elements 422 and 424. In the embodiment illustrated in FIG. 5, shields 514 and 518 provide a barrier between grounded structure 502 and conductors 504 and 506. Similarly, edges 640 and 642 of the embodiment disclosed in FIG. 6 also are of adequate distance from skirts 609 to present a small animal from simultaneously contacting the grounded housing and the conductor. Finally, in all embodiments, any peripheral edge of a shield is a sufficient distance from any peripheral edge of an insulator or bushing skirt to prevent an animal from simultaneously contacting a grounded structure and a conductor.

As explained above, each of the shield assembly embodiments illustrated in FIGS. 7–15 also include peripheral edge portions which are sufficiently distant from both inside edge portions of the elements as well as peripheral edge portions of the intermediary devices to prevent a small animal from simultaneously contacting the grounded structure and energized conductor.

It should be apparent to those skilled in the art that the shield disclosed in each embodiment of the present invention may have any shape. With regard to the embodiments illustrated in FIGS. 1 through 4 and 6 through 15, any fastening means or hinge can be utilized to attach each element of each shield around an insulator or bushing. Furthermore, any number of slits may be provided in each element of a shield regardless of overall shield shape. Moreover, each embodiment may be transparent, opaque or translucent.

In addition, although the invention has particular applicability to power distribution substations, its principles could be embodied in other devices which contain exposed, electrically energized surfaces in close proximity to grounded, conductive structures.

It should also should be understood that various changes to the present invention may be made by the ordinarily skilled artisan, without departing from the spirit and scope of the present invention which is set forth in the claims below. The ordinarily skilled artisan will understand that this disclosure represents an example of the invention and is not meant to limit the invention, as presented in the claims, in any way whatsoever.

What is claimed is:

1. For use between electrical conductors having different electrical potentials, a shield assembly for preventing small animals from simultaneously contacting the conductors comprising:
   a first substantially U-shaped plate-like shield element, said shield element including
      first and second front edge portions,
      an inside edge portion disposed between said first and second edge portions, and
      a peripheral edge portion disposed generally opposite said first, second and inside edge portions;
   a second plate-like shield element including
      first and second front edge portions, and an inside edge portion disposed between said first and second edge portions,
      a peripheral edge portion disposed generally opposite said first, second and inside edge portions;
   a hinge for rotatingly connecting said first shield element to said second shield element, whereby when said first and second shield elements are rotated into a closed position, said inside edge portions of said first and second shield elements define an opening of predefined shape and area;
   said hinge being disposed near said first edge portions of said first and second plate-like shield elements; and
   a bias for rotatingly biasing said first and second plate-like shield elements into engagement around an intermediary device.

2. The shield assembly of claim 1 wherein said first substantially U-shaped plate-like shield element and said second plate-like shield element combine to define a minimum radial dimension large enough to prevent small animals from simultaneously contacting said conductors when positioned around said intermediary device.

3. The shield assembly of claim 1 further including:

a fastener for releasably fastening said first shield element to said second shield element near said second edge portions of said Shield elements.

4. The shield assembly of claim 3 wherein said fastener further includes:

at least one depression on a surface of said second shield element; and a member disposed on said first shield element adapted to releasably engage said at least one depression on said second shield element.

5. The shield assembly of claim 4 wherein said fastener further includes:

a plurality of said depressions disposed on said surface of said second shield element; and biasing means for forcing said member into engagement with one of said depressions, wherein said fastener releasably locks said shield assembly into a closed position between the conductors.

6. The shield assembly of claim 1 further including:

a tapered edge portion on each of said shield elements disposed between said peripheral edge and said front edge portions opposite said hinge, wherein said tapered edge portions are adapted to spread said shield elements away from each other for mounting said shield assembly between the conductors.

7. The shield assembly of claim 1 wherein said bias includes:

a spring having a first end connected to said first shield element and a second end connected said second shield element, said spring being adapted to bias said first shield element toward said second shield element to facilitate mounting of said shield assembly between the conductors.

8. The shield assembly of claim 1 wherein said bias is disposed on said assembly between said hinge and said inside edge portions of said shield elements.

9. The shield assembly of claim 1 wherein said bias is a torsion spring fastened to said first and second shield elements near said hinge.

10. The shield assembly of claim 1 wherein said shield elements are constructed from a thermoplastic resin.

11. The shield assembly of claim 1 wherein said shield elements are constructed from a thermosetting resin.

12. The shield assembly of claim 1 wherein said shield elements are opaque.

13. The shield assembly of claim 1 wherein said shield elements include plurality of sight apertures.

14. The shield assembly of claim 1 wherein said shield elements include gripping apertures on said shield elements adapted to accept a tool for spreading said shield elements apart.

15. The shield assembly of claim 14 wherein said shield elements include said gripping apertures between said peripheral edge and said inside edge portions of said shield elements.

16. The shield assembly of claim 14 wherein said gripping apertures are between said peripheral edge portions and said hinge.

17. The shield assembly of claim 14 wherein said shield elements include protrusions extending outward from said peripheral edge portions and said gripping apertures are formed in said protrusions.

18. For use between electrical conductors having different electrical potentials, a shield assembly for preventing small animals from simultaneously contacting the conductors comprising:

a first substantially U-shaped plate-like shield element, said shield element including a first and second front edge portions, an inside edge portion disposed between said first and second edge portions, and a peripheral edge portion disposed generally opposite said first, second and inside edge portions;

a second plate-like shield element including a peripheral edge portion, an inside edge portion; and a first hinge for rotatingly connecting said first shield element to said second shield element, whereby when said first and second shield elements are rotated into a closet position, said inside edge portions of said first and second shield elements define an opening of predefined shape and area;

a slot in said first shield element disposed between said first and second edge portions terminating at said inside edge portion;

a third shield element including an inside edge portion, and a peripheral edge portion;

a second hinge for rotatably mounting said third shield element near said second edge portion of said first shield element;

wherein said first hinge is located near said first edge portion of said first shield element; and whereby when rotated into a closed portion, said inside edge portions of said first, second and third shield elements define an opening of predefined shape and area.

19. For use between electrical conductors having different electrical potentials, a shield assembly for preventing small animals from simultaneously contacting the conductors comprising:

a first substantially U-shaped plate-like shield element, said shield element including a first and second front edge portions, an inside edge portion disposed between said first and second edge portions, and a peripheral edge portion disposed generally opposite said first, second and inside edge portions;

a second plate-like shield element including a peripheral edge portion, inside edge portion; and a first hinge for rotatingly connecting said first shield element to said second shield element, whereby when said first and second shield elements are rotated into a closet position, said inside edge portions of said first and second shield elements define an opening of predefined shape and area; and said shield elements include means for protecting said shield elements from degradation due to ultra-violet light.

20. For use between electrical conductors having different electrical potentials, a shield assembly for preventing small animals from simultaneously contacting the conductors comprising:

a plate-like first shield element including a longitudinal slot extending from an outer periphery thereof and terminating in a center portion of said first shield element;

a second shield element having a peripheral edge portion and an inside edge portion, said second shield element adapted to slidingly engage said first shield element by partially overlapping corresponding portions of said first shield element; and a fastener for releasably attaching said first and second shield elements to form said shield assembly whereby when said second shield element sliding engages said first shield element, a terminal portion of said slot and said inside edge portion of said second shield element define an opening of predefined shape and area.

21. The shield assembly of claim 20 further including:

at least one depression on a surface of said first shield element; and a member disposed on said second shield element adapted to releasably engage said at least one depression on said second shield element.

22. The shield assembly of claim 21 further including:

front and back planar surfaces on said first shield element;

longitudinal edge portions on said second shield element; and a guide on said longitudinal edge portions of said second shield element for engaging said front and back planar surfaces of said first shield element and for securing said first shield element to said second shield element.

23. The shield assembly of claim 20 wherein said shield elements include means for protecting said shield elements from degradation due to ultraviolet light.

24. The shield assembly of claim 20 wherein said shield elements are constructed from a thermoplastic resin.

25. The shield assembly of claim 20 wherein said shield elements are constructed from a thermosetting resin.

26. The shield assembly of claim 20 wherein said shield elements are opaque.

27. The shield assembly of claim 26 wherein said shield elements include plurality of sight apertures.

28. For use between electrical conductors having different electrical potentials, a shield assembly for preventing small animals from simultaneously contacting the conductors comprising:

first and second shield elements, each of said shield elements including a substantially U-shaped plate having a longitudinal slot extending from an outer periphery thereof and terminating in a center portion thereof, and front and back planar surfaces; and a fastener for fastening said first and second shield elements together including at least one longitudinal protrusion disposed on said front surface of one of said shield elements; and at least one longitudinal depression disposed on said back surface of another of said first shield elements for matingly engaging said at least one longitudinal protrusion, whereby when said first and second shields are slidingly engaged, terminal portions of said slots form an opening of predefined shape and area.

29. The shield assembly of claim 28 wherein said assembly further includes:

at least one extension for extending said shield; and said fastener further including an additional longitudinal protrusion for matingly engaging said at least one longitudinal depression on said one of said shield elements, and an additional longitudinal depression for matingly engaging said at least one longitudinal protrusion on said another of said shield elements.

30. The shield assembly of claim 28 wherein said shield elements include means for protecting said shield elements from degradation due to ultraviolet light.

31. The shield assembly of claim 28 wherein said shield elements are constructed from a thermoplastic resin.

32. The shield assembly of claim 28 wherein said shield elements are constructed from a thermosetting resin.

33. The shield assembly of claim 28 wherein said shield elements are opaque.

34. The shield assembly of claim 33 wherein said shield elements include plurality of sight apertures.

35. For use between electrical conductors having different electrical potentials, a plate-like shield for preventing small animals from simultaneously contacting the conductors comprising:

a peripheral edge portion extending around said shield;

an inside edge portion defining a first centralized aperture; and a first slit between said peripheral edge portion and said inside edge portion for allowing said shield to be mounted between the conductors; and a bias for biasing said shield into engagement between the conductors; and protection means for protecting such shield from degradation due to ultra-violet light.

36. The shield assembly of claim 35 wherein said peripheral edge portion is sufficiently distant from said inside edge portion in said shield element to prevent a small animal from simultaneously contacting the grounded structure and the conductor.

37. The shield assembly of claim 35 further including:

a tapered edge portion on said peripheral edge portion adapted to allow said shield to expand for mounting said shield assembly between the conductors.

38. The shield of claim 35 wherein said shield is constructed from a thermoplastic resin.

39. The shield of claim 35 wherein said shield is constructed from a thermosetting resin.

40. The shield of claim 35 wherein said shield is opaque.

41. The shield assembly of claim 35 wherein said shield elements include plurality of sight apertures.

42. For use between electrical conductors having different electrical potentials, a plate-like shield for preventing small animals from simultaneously contacting the conductors comprising:

a peripheral edge portion extending around said shield;

an inside edge portion defining a first centralized aperture for fitting around an intermediate device;

a first slit between said peripheral edge portion and said inside edge portion for allowing said shield to expand around the intermediate device;

a second aperture formed in said shield near said peripheral edge portion and opposite said first slit;

a second slit formed between said first aperture and said second aperture; and protection means for protecting such shield from degradation due to ultra-violet light;

wherein said second slit and said second aperture form a hinge portion within said shield for biasing said shield into position between the conductors.

* * * * *